United States Patent [19]

Lightsey

[11] Patent Number: 6,005,514
[45] Date of Patent: Dec. 21, 1999

[54] METHOD FOR ATTITUDE DETERMINATION USING GPS CARRIER PHASE MEASUREMENTS FROM NONALIGNED ANTENNAS

[75] Inventor: Edgar Glenn Lightsey, Ellicott City, Md.

[73] Assignee: United States of America as represented by the Administrator of the National Aeronautics and Space Administration, Washington, D.C.

[21] Appl. No.: 08/929,912

[22] Filed: Sep. 15, 1997

[51] Int. Cl.$^6$ ............................. H01Q 21/06; G01S 5/02
[52] U.S. Cl. ....................................... 342/365; 342/357.11
[58] Field of Search ................................... 342/365, 357, 342/357.11; 701/215

[56] References Cited

U.S. PATENT DOCUMENTS

| | | |
|---|---|---|
| 5,296,861 | 3/1994 | Knight . |
| 5,347,286 | 9/1994 | Babitch . |
| 5,446,465 | 8/1995 | Diefes et al. . |
| 5,506,588 | 4/1996 | Diefes et al. . |
| 5,534,875 | 7/1996 | Diefes et al. . |
| 5,548,293 | 8/1996 | Cohen . |

OTHER PUBLICATIONS

Clark E. Cohen and Bradford W. Parkinson, "Expanding the Performance Envelope of GPS–Based Attitude Determination", ION GPS, Albuquerque, NM Sep. 9–13, 1991.

Don Knight, "A New Method of Instantaneous Ambiguity Resolution", Proceedings of ION GPS–94 7th International Technical Meeting of the Satellite Division of the Institute of Navigation Salt Palace Convention Center, Salt Lake City Utah Sep. 20–23, 1994 pp. 707–716.

R.L. Greenspan, A.Y. Ng, J.M. Przyjemski, J.D. Veales, "Accuracy of Relative Positioning by Interferometry with Reconstructed Carrier GPS: Experimental Results," Proc. Of the Third Intl. Geodetic Symposium on Satellite Positioning, Las Cruces, NM, Mar. 1982.

L.R. Kruczynski, P.C. Li, A.G. Evans, B.R. Hermann, "Using GPS to Determine Vehicle Attitude: USS Yorktown Test Results," Proc. Int. Tech. Mtg., Institute of Navigation (ION), Colorado Springs, CO, Sep. 1989.

F. van Graas, M. Braasch, "GPS Interferometric Attitude and Heading Determination: Initial Flight Test Results," Navigation, vol. 38, Fall, 1991.

C.E. Cohen, Attitude Determination Using GPS, Ph.D. Dissertation, Stanford University, Dec. 1992.

C.E. Cohen, "Attitude Determination," Global Positioning System: Theory and Applications, vol. II, American Institute of Aeronautics and Astronautics (AIAA), 1996.

R. Fuller, S. Gomez, L. Marradi, J. Rodden, "GPS Attitude Determination From Double Difference Differential Phase Measurements," ION GPS–96, Kansas City, MO, Sep. 1996.

P. Montgomery, Carrier Differential GPS as a Sensor for Automatic Control, Ph.D. Dissertation, Stanford University, Jan. 1996.

TANS Vector GPS Attitude Determination System: Specification and User's Manual, Trimble Navigation, Ltd., Sunnyvale, CA, 1994.

G.H. Golub, C.F. Van Loan, Matrix Computations, The Johns Hopkins University Press, 1989. Chapters 2 and 3, pp. 49–131.

(List continued on next page.)

*Primary Examiner*—Mark Hellner

[57] ABSTRACT

A correction to a differential phase measurement used for vehicle attitude determination on nonaligned antenna arrays is determined by calculating a carrier phase angle of carrier signals received by each antenna, and correcting the measurement for the right-hand circular polarization effect on the nonaligned antennas. Accordingly, circular polarization effects of the carrier signals are removed from a nonaligned antenna array, allowing the nonaligned antenna array to be used for vehicle attitude determination.

22 Claims, 14 Drawing Sheets

OTHER PUBLICATIONS

W.H. Press, S.A. Teukolsky, W.T. Vettering, B.P. Flannery, Numerical Recipes in C: The Art of Scientific Computing, Cambridge University Press, 1992. Chapter 2, pp. 32–104.

H.U. Uematsu, B.W. Parkinson, and E.G. Lightsey, "GPS Receiver Design and Requirement Analysis for the Stanford Gravity Probe B Relativity Mission," ION GPS–95, Palm Springs, CA, Sep. 1995.

D. Lawrence, et al, "Maintaining GPS Positioning in Steep Turns Using Two Antennas," ION GPS–95, Palm Springs, CA, Sep. 1995.

J.A. Klobuchar, "Design and Characteristics of the GPS Ionospheric Time Delay Algorithm for Single Frequency Users," IEEE Plans, Las Vegas, NV, Nov. 1986.

J.R. Wertz, ed., Spacecraft Attitude Determination and Control, D. Reidel Co., 1978. Appendix A, Spherical Geometry.

C.E. Cohen, E.G. Lightsey, W.A. Feess, B.W. Parkinson, "Space Flight Tests of Attitude Determination Using GPS," Intl. Journal of Satellite Communications, vol. 12, 1994.

"GPS Based Attitude Determination on Nonaligned Antenna Arrays", Lightsey and Parkinson; Sep. 17, 1996.

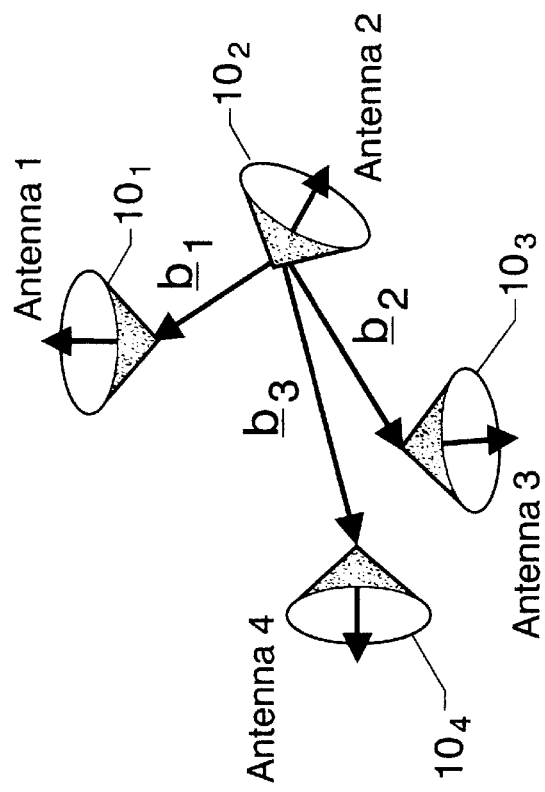
FIG. 11(B) If Antenna 2 Is Master:
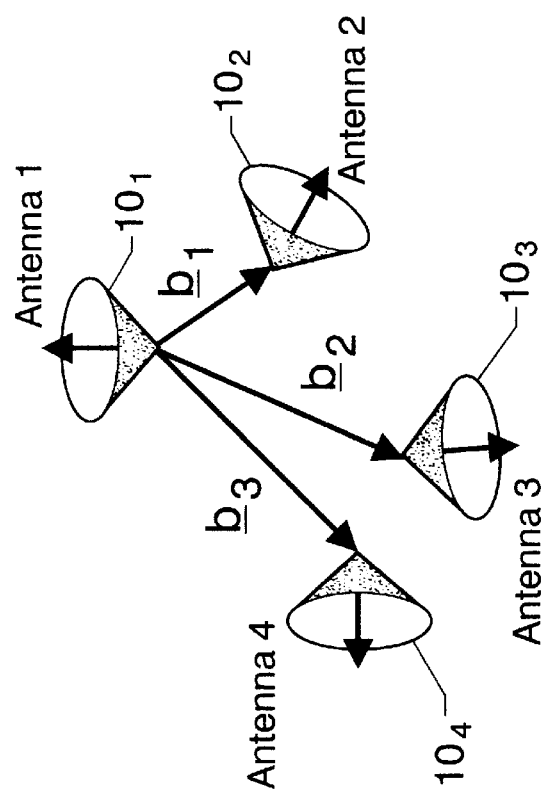
FIG. 11(A) If Antenna 1 Is Master:

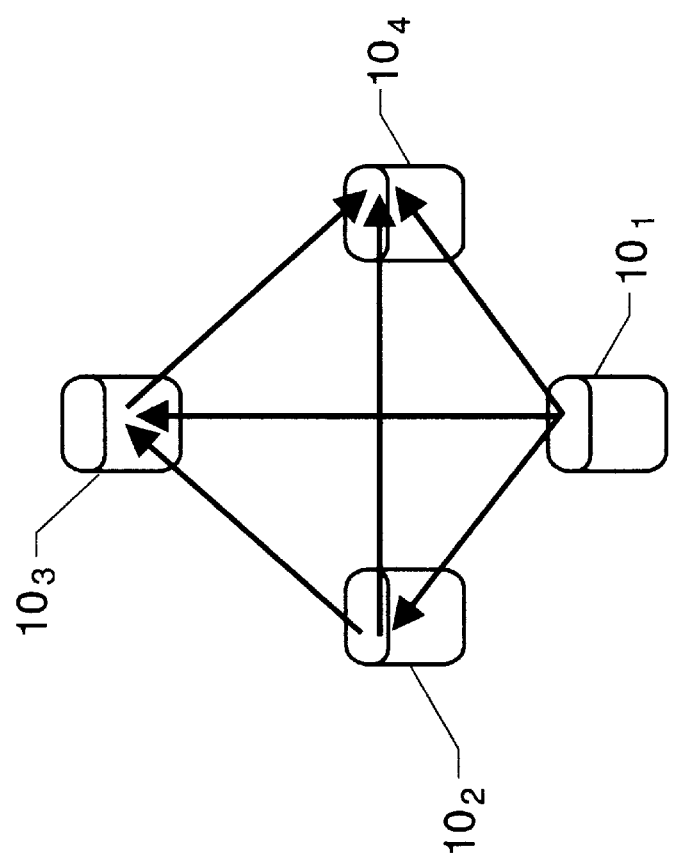
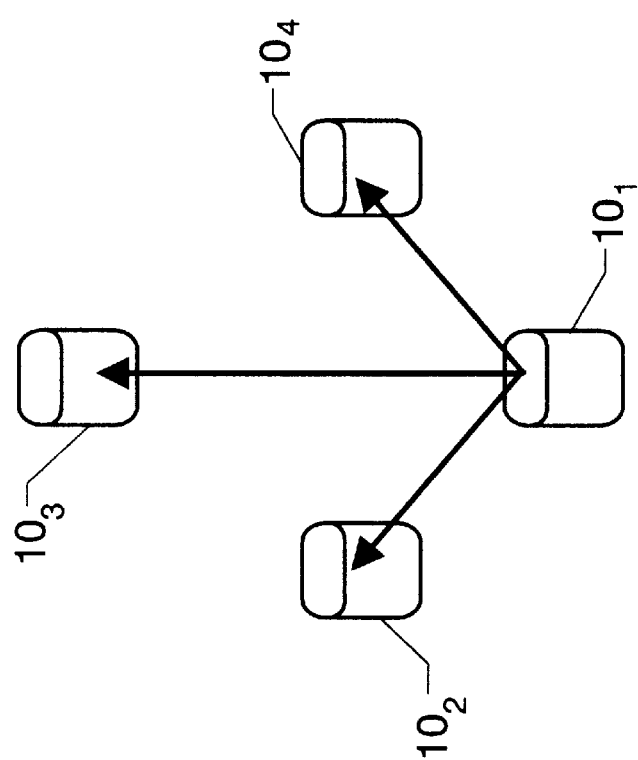
FIG. 12(B)
FIG. 12(A)

METHOD FOR ATTITUDE DETERMINATION USING GPS CARRIER PHASE MEASUREMENTS FROM NONALIGNED ANTENNAS

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Technical Field of the Invention

The present invention relates to using Global Positioning System (GPS) signals received by nonaligned antennas mounted on a vehicle to determine the attitude of the vehicle, and, in particular, to correcting measurements of the GPS signals received by the nonaligned antennas to compensate for the respective orientations of the nonaligned antennas.

This application is based on "Development and Flight Demonstration of a GPS Receiver for Space", a dissertation submitted to the Department of Aeronautics and Astronautics and the Committee on Graduate Studies of Stanford University in partial fulfillment of the requirements for the degree of Doctor of Philosophy, by Edgar Glenn Lightsey, February, 1997, UMI Number 9723388, UMI, A Bell & Howell Information Company, 300 North Zeeb Road, Ann Arbor, Mich. 48106-1346 USA, 313/761-4700, and which is incorporated herein by reference, and on *GPS Based Attitude Determination On Nonaligned Antenna Arrays*, by E. Glenn Lightsey, NASA Goddard Space Flight Center, and Bradford W. Parkinson, Ph.D., Stanford University, technical paper, Institute of Navigation GPS-96 Conference, incorporated herein by reference.

2. Background Art

The principles of attitude determination using GPS carrier phase interferometry are well documented in the literature (C. E. Cohen, Attitude Determination Using GPS, Ph.D. Dissertation, Stanford University, December 1992 and C. E. Cohen, "Attitude Determination," Global Positioning System: Theory and Applications, vol. II, American Institute of Aeronautics and Astronautics (AIAA), 1996), pps. 519–537, incorporated herein by reference.

The use of the Global Positioning System (GPS) for vehicle attitude determination is disclosed in U.S. Pat. No. 5,548,293, "System and method for generating attitude determinations using GPS", issued Aug. 20, 1996, to Clark E. Cohen, incorporated herein by reference.

A method for comparing the relative phase of carrier signals received from Global Positioning System satellites to determine the roll, pitch, and azimuth attitude of ships, aircraft, land vehicles, or survey instruments using a maximum likelihood estimation (MLE) optimum solution over a full range of integers and vehicle attitudes is discussed in "Method and Apparatus for Maximum Likelihood Estimation Direct Integer Search in Differential Carrier Phase Attitude Determination Systems", U.S. Pat. No. 5,296,861 to Donald T. Knight, incorporated herein by reference.

The spherical trigonometry of phase angle measurements is disclosed in *Spacecraft Attitude Determination and Control*, J. R. Wertz, ed., D. Reidel Co., 1978.

Vehicle attitude determination using GPS signals is made, taking into account the differential phase received by, for example, three antennas from the same GPS signals. GPS signal acquisition is described in "Development and Flight Demonstration of a GPS Receiver for Space", id.

Conventional methods of vehicle attitude determination include using the differential phase of the GPS signals received by several different antennas, which are all aligned with each other and pointed in the same direction, relative to the GPS signal being received. In determining the attitude of a vehicle using the differential phase method, an absolute phase of the GPS signal received by one antenna is subtracted from the absolute phase of the GPS signal received by a second antenna, as shown below:

$$\Delta\phi=\phi_2-\phi_1$$

The above-mentioned equation provides information about how far apart a first antenna is from a second antenna along the GPS signal line of sight. By calculating the differential phase ($\Delta\phi$), common error sources interjected by the GPS signal and by the reception of the GPS signal by the antennas are removed. For example, the GPS signal is a right handed circular polarized (RHCP) signal, and the phase contribution due to this polarization effect is removed by calculating the differential phase of the GPS signal.

Signals broadcast from Global Positioning System (GPS) satellites have previously been used to determine vehicle position. Attitude determination of a platform or vehicle using carrier signals has not traditionally been considered a standard GPS measurement, but attitude determination of a vehicle using GPS carrier signals greatly enhances the overall utility of a device sensing GPS signals, and has been performed in recent years. All of the information required for vehicle attitude control, and, further, for autonomous position control and precise timing, is available in a single package at reasonable mass, power, and cost. Accordingly, this consolidation of sensory resources makes the GPS receiver a powerful component for many Low Earth Orbit (LEO) spacecraft applications.

The concept of attitude determination using GPS carrier phase interferometry was first demonstrated by Greenspan, et al, in 1982 (R. L. Greenspan, A. Y. Ng., J. M. Przyjemski, J D. Veales, "Accuracy of Relative Positioning by Interferometry with Reconstructed Carrier GPS: Experimental Results", Proc. Of the Third Intel. Geodetic Symposium on Satellite Positioning, Las Cruces, N. M., Mar. 1982). After several initial demonstrations on platforms, ships, and aircraft during the 1980s (see L. R. Kruczynski, P. C. Li, A. G. Evans, B. R. Hermann, "Using GPS to Determine Vehicle Attitude: USS Yorktown Test Results," Proc. Int. Tech. Mtg., Institute of Navigation (ION), Colorado Springs, Colo., September 1989, and F. van Graas, M. Braasch, "GPS Interferometric Attitude and Heading Determination: Initial Flight Test Results," Navigation, vol. 38, Fall, 1991), the first commercial terrestrial receivers capable of performing 3-axis (x, y, and z) GPS carrier phase-based attitude determination were marketed in the early 1990s. Several algorithmic improvements to the state of the art were made and the accuracy of the attitude determination system was demonstrated through aircraft experiments in 1992 (C. E. Cohen, *Attitude Determination Using GPS*, Ph.D. Dissertation, Stanford University, December 1992).

In the present application, "zenith" refers to a direction directly away from the center of the Earth (i.e., "up"), "nadir" refers to a direction directly into the center of the Earth (i.e., "down"). In addition, a master antenna is one from which relative distances and measurements are calculated, and slave antennas are those antennas for which relative distances to and measurements by the master are calculated.

A widely used method of GPS attitude determination is illustrated in FIG. 1, and is referred to as the Carrier Phase Interferometry Method of Attitude Determination. As shown in FIG. 1, two antennas 10 are separated by a known fixed distance, $[\underline{b}]_B$ (also referred to as the antenna baseline vector), expressed in a body referenced coordinate frame 'B'. Carrier wave signals 11, such as L1 carrier signals (wavelength $\lambda \cong 19$ cm), originate from a GPS satellite 12 along a known line of sight $[\underline{s}]_E$, expressed as a unit vector in an external reference frame 'E'. The known line of sight implies that the position of the GPS satellite 12 and the position of the receiver on which the antennas 10 are placed are at least approximately known. Because the GPS satellite 12 is far away from the antennas 10, the carrier wavefronts 14 are essentially planar.

The range projection of the antenna baseline onto the line of sight vector may be expressed as:

$$\Delta r = \underline{s}^T \underline{b} \quad (1)$$

$\Delta r$ can be expressed in any units of distance, such as meters, but is more conveniently represented in wavelengths ($\lambda$) for this derivation. The superscript T indicates the transpose of the matrix. Recognizing that one carrier phase wavefront is indistinguishable from the next, the true range projection can be expressed in terms of an ideal differential carrier phase measurement:

$$\Delta r = \underline{s}^T \underline{b} = \Delta \phi - k \quad (2)$$

where $\Delta \phi$ is the differential carrier phase measurement (a fractional number between 0 and 1 wavelength) and k is a differential integer that accounts for the integer number of wavelengths in the distance $\Delta r$. For example, if $\Delta r < 19$ cm, k=0 regardless of the orientation of $\underline{b}$. The minus sign on k results from construction in FIG. 1.

$\Delta \phi$ can in general be outside the bounds of one wavelength due to phase wraparound. The integer k is adjusted only at discrete times (such as the first attitude computation), and during other times the integer k is treated as a constant. $\Delta \phi$ may therefore contain an integer component as well, after the carrier phase measurement has gone through more than one rotation of $2\pi$; $\Delta \phi$ is nonetheless termed the 'fractional' carrier phase measurement to distinguish $\Delta \phi$ from the integer term k.

Since the baseline vector $\underline{b}$ is known in the vehicle body reference frame, and the GPS signal line of sight $\underline{s}$ is known in the external reference frame, the attitude of the body frame may be expressed with respect to an ideal differential carrier phase measurement as:

$$\Delta r = \underline{s}^T \underline{b} = [\underline{s}^T]_E \underline{\underline{A}}_{E>B}^T [\underline{b}]_B = \Delta \phi - k \quad (3)$$

where $\underline{\underline{A}}_{E>B}$ represents the 3×3 direction cosine transformation matrix from the external reference to the body reference. If the differential integers ("cycle ambiguities") are known, this represents a nonlinear equation that can be solved to obtain the attitude of the antenna platform 10 in the external reference frame. $\underline{\underline{A}}_{E>B}$ has three independent unknowns, meaning that this equation may be theoretically solved if there are as few as three differential phase measurements, for example from three antennas and two GPS signals, provided these measurements span a three dimensional space. However, two GPS signals along the same line of sight would not span a three dimensional space.

Equation 3 is modified to account for real measurements by including two additional terms:

$$[\underline{s}^T]_E \underline{\underline{A}}_{E>B}^T [\underline{b}]_B = \Delta \phi - k - \beta - v \quad (4)$$

$\beta$ is a known calibration constant which is a function of the receiver hardware and the antenna pair in question. $\beta$ is called the line bias, and represents the electrical line length from the antenna phase center through the cable to the measurement point inside the receiver. In this difference equation, the term line bias actually refers to the differential bias; i.e., the line bias of the slave antenna electrical path minus the master antenna electrical path. The line bias quantity is a function of the GPS antenna/receiver hardware and can be determined in advance and saved using a calibration technique (C. E. Cohen, Attitude Determination Using GPS, Ph.D. Dissertation, Stanford University, December 1992).

The remaining term, v, is an additive measurement noise term, and includes all noise effects such as multipath, carrier tracking noise, bias drifts, and others. Once again, what is measured in this case is a differential noise between the slave and master antenna; only non-common mode noise sources remain after the differencing operation. Clock offset, for example, is not a differential noise source, since it is common to each antenna. The noise term v has time correlated properties that in some cases may be modeled or calibrated, but in this analysis these effects are treated as measurement error.

Equation 4 is the fundamental GPS differential carrier phase measurement equation. It may be expanded to account for all GPS satellites being tracked (i), across all antenna baselines (j), to accommodate all measurements made during one sample interval:

$$\Delta \phi_{ij} = [\underline{s}_i^T]_E \underline{\underline{A}}_{E>B}^T [\underline{b}_j]_B + k_{ij} + \beta_j V_{ij} \quad (5)$$

Equation (5), then, is the basic vehicle attitude determination equation. In the above-mentioned equation, $\Delta \phi_{ij}$ is the measured differential phase, $k_{ij}$ is the integer cycle ambiguity, $\beta_j$ is the electrical line bias, and $V_{ij}$ is the noise. The equation is rearranged so that the fractional carrier phase measurement appears on the left and all other terms are separated on the right. With enough measurements, it is possible to solve for the cycle ambiguities, $k_{ij}$, and the direction cosine matrix $\underline{\underline{A}}_{E>B}$. Although, as previously noted, the attitude may be theoretically determined from as few as three ideal (i.e., noiseless) differential carrier phase measurements, more measurements are required in practice to account for the presence of the measurement noise.

Once the cycle ambiguities $k_{ij}$ are known, the cycle ambiguities may be removed from the problem of determining the attitude of the vehicle, and if $\underline{\underline{A}}_{E>B}$ is approximately known as $(\underline{\underline{A}}_{E>B})_0$, a perturbation equation may be developed as follows:

$$(\Delta \phi_{ij})_0 = [\underline{s}_i^T]_E (\underline{\underline{A}}_{E>B}^T)_0 [\underline{b}_j]_B + k_{ij} + \beta_j \quad (6)$$

$$\delta \phi_{ij} = \Delta \phi_{ij} - (\Delta \phi_{ij})_0 = [\underline{s}_i^T]_E \underline{\underline{A}}_{E>B}^T [\underline{b}_j]_B - [\underline{s}_i^T]_E (\underline{\underline{A}}_{E>B}^T)_0 [\underline{b}_j]_B + v_{ij} \quad (7)$$

For sufficiently small perturbations, the attitude matrix $\underline{\underline{A}}_{E>B}$ may be linearized for small rotations about the body axes:

$$\underline{\underline{A}}_{E>B} = (A_{E>B})_0 \cdot (\underline{\underline{I}} + \underline{\underline{\Theta}}^x) \quad (8)$$

$$\Theta^x = \begin{bmatrix} 0 & -\delta \theta_z & \delta \theta_y \\ \delta \theta_z & 0 & -\delta \theta_x \\ -\delta \theta_y & \delta \theta_x & 0 \end{bmatrix} \quad (9)$$

Then $$\delta\varphi_{ij} = [\underline{s}_i^T]_E (\underline{A}_{E>B}^T)_0 \underline{\Theta}^x [\underline{b}_j]_B + v_{ij} \quad (10)$$

$$= -[\underline{s}_i^T]_E (\underline{A}_{E>B}^T)_0 \underline{B}_j^x \delta\underline{\theta} + v_{ij}$$

$$= \underline{h}_{ij} \delta\underline{\theta} + v_{ij}$$

$$\underline{B}_j^x = \begin{bmatrix} 0 & -b_{jz} & b_{jy} \\ b_{jz} & 0 & -b_{jx} \\ -b_{jy} & b_{jx} & 0 \end{bmatrix} \cdot [\underline{b}_j]_B = \begin{bmatrix} b_{jx} \\ b_{jy} \\ b_{jz} \end{bmatrix} \cdot \delta\underline{\theta} = \begin{bmatrix} \delta\theta_x \\ \delta\theta_y \\ \delta\theta_z \end{bmatrix} \quad (11)$$

The superscript X indicates cross matrix of a vector. Equation 10 represents a linearized sensitivity equation between the measured differential carrier phase and the perturbation to the initial attitude guess. $\underline{h}_{ij}$ is a 1×3 row vector that may be thought of as a set of linearized sensitivity coefficients for every measurement equation. For a given sample, all 'valid' differential phase measurements (i.e., those for which the cycle ambiguities are known) are stacked into a single linearized vector equation:

$$\underline{H} = \begin{bmatrix} \underline{h}_{11} \\ \vdots \\ \underline{h}_{mn} \end{bmatrix} \quad (12)$$

$$\delta\underline{\varphi} = \underline{H} \, \delta\underline{\theta} + \underline{v} \quad (13)$$

This equation presents an overdetermined linear system with additive noise whose solution may be obtained by minimizing the residual in the least squares sense (or according to any other appropriate performance index). The solution, $\delta\underline{\phi}$, is a 3×1 vector correction of small rotations to the direction cosine matrix $(\underline{\underline{A}}_{E>B})_0$ as defined by Equation 8. The solution may be obtained iteratively using the previous epoch solution as an initial guess.

A typical GPS signal receiver 13 of the prior art, used for navigation and attitude determination, is shown in FIG. 2. The GPS receiver 13 shown in FIG. 2 includes a navigation board 15 and an attitude board 17. As shown in FIG. 2, GPS carrier signals are received by antennas 10, the signal strength is enhanced by pre-amplifiers 19, and delivered to mux 21 through 50 Ω coaxial cables. The output of the mux 21 is presented to the RF section 23, then is delivered through 6 channels 25 to processor 27 (Motorola 68000). The foregoing aspects of the GPS receiver 13 are based on the Trimble Advanced Navigation Sensor (TANS) Vector, manufactured by Trimble Navigation, Ltd. Output from both processor 27 and processor 29 is then serially transmitted outside of the GPS receiver 13.

The flow of information for differential, carrier phase-based attitude determination is summarized in FIG. 3. Many types of measurements are combined in different ways to produce the ultimate output product, real-time attitude solutions 36. Prior to real-time operation, calibration measurements 16 are taken to determine the antenna line biases and baseline vectors in the body reference frame. This information is then saved for later use. During the real-time operation, the receiver position estimate is obtained from a position fix, if available, or an orbit propagator solution 22.

The GPS satellite position is computed from the broadcast GPS ephemeris 24 and combined with the receiver position 26 to produce the signal line of sight vector, $[\underline{s}]_E$. This information is collected along with differential carrier phase measurements 20 which are used to resolve the carrier cycle ambiguities. The integer resolution procedure 28 is solved once by conventional methods, and then removed from the attitude determination problem as in Equations 6 and 7. Once the integers are obtained, these values are periodically updated as new measurements are added and real-time attitude solutions are computed in the method of Equations 7 to 13. As long as the sample rate is relatively fast compared to the vehicle dynamics, the previous sample may serve as an initial guess to the next solution. Integrity checks 30 are readily available in the form of the solution residual, and other parameters, during both the bootstrap integer resolution 28 and the real-time attitude solution processes 34.

Equations 6 and 7 assume that the line bias terms $\beta_j$ are known in advance and may be subtracted from the available measurements. In fact, these parameters may not be constants nor well known in advance. An example of a method for determining vehicle attitude is to bypass the need to know the line bias term by double-differencing the carrier phase measurements along the same baseline vector (R. Fuller, S. Gomez, L. Marradi, J. Rodden, "GPS Attitude Determination From Double Difference Differential Phase Measurements," ION GPS-96, Kansas City, Mo., September 1996):

$$\nabla\Delta\phi_{12j} = [(\underline{s}_1 - \underline{s}_2)^T]_E \underline{\underline{A}}_{E>B}^T [\underline{b}_j]_B + (k_{ij} - k_{2j}) + (v_{1j} - v_{2j}) \quad (14)$$

This formulation circumvents the problem of calibrating and/or modeling $\beta_j$ at the cost of a decrease in the number of available total measurements, which are reduced by the double differencing operation. The double-difference measurements are also more noisy than in the single-difference case.

The most common LEO spacecraft attitude determination applications are classified in terms of three types of pointing: Earth referenced, inertially referenced, and spinning. These may be contrasted with typical static terrestrial environments, such as survey applications, and dynamic terrestrial environments, such as aviation or maritime applications.

There are significant differences between terrestrial and space GPS carrier phase based attitude determination, such as motion and visibility, as shown in Table 1.

A substantive difference between terrestrial and LEO space applications concerns the magnitude and the cause of the motion in the carrier phase measurements as recorded by the GPS receiver, and their magnitudes relative to GPS line of sight motion. The cause of relative motion is important to the structure of cycle ambiguity resolution equations. Cycle ambiguity is discussed in *Attitude Determination Using GPS*, by C. E. Cohen, Ph.D. dissertation, Stanford University, December, 1992, in *Development and Flight Demonstration of a GPS Receiver for Space*, id, and herein below.

TABLE 1

Comparison of Terrestrial and Orbital GPS Attitude Determination Environments

| Application Type | Terrestrial | | Orbital | | |
|---|---|---|---|---|---|
| | | | Earth | Inertially | |
| | Static | Dynamic | Pointed | Pointed | Spinning |
| Antenna Pointing | Zenith | | Zenith | Full Sky | |
| GPS Line of Sight Motion | 180 degrees per 360 minutes | | 180 degrees per 45 minutes | | |

TABLE 1-continued

Comparison of Terrestrial and Orbital
GPS Attitude Determination Environments

| Application | Terrestrial | | Orbital | | |
|---|---|---|---|---|---|
| | | | Earth | Inertially | |
| Type | Static | Dynamic | Pointed | Pointed | Spinning |
| Vehicle Dynamics | None | Several deg. Per minute | <1 rev. per orbit = <4 deg. per minute | | 0.1– 20 + rev. per min. |
| Carrier Phase Motion Relative to GPS Line of Sight Motion | None | More | | Same | More |

The other significant difference between terrestrial and space applications, which is addressed by the present invention as explained herein below, is signal visibility.

In terrestrial applications, whether dynamic or static, the antenna array is generally always pointed approximately upwards. The GPS Constellation resides within the hemisphere to which the antenna array points. Even in the most demanding applications, such as aircraft attitude determination during a steep bank, the bank angle rarely exceeds 45 degrees. However, in some terrestrial applications such as mobile communications, even though all of the antennas in the array may be pointed approximately upwards, all of the antennas may not be aligned with each other (pointed in the same direction).

For an inertially fixed or spinning spacecraft, however, there is no hemisphere on the vehicle body that points in the direction of the GPS constellation all the time. The foregoing pointing profiles are shown schematically in FIGS. 4(A), 4(B), and 4(C).

As shown in FIGS. 4(A), 4(B), and 4(C), arrows 38 indicate the direction that the GPS antennas 10 (not shown in FIGS. 4(A), 4(B), and 4(C)) are pointed. In addition, FIGS. 4(A), 4(B), and 4(C) show the relationship between the direction 38 in which the GPS antennas 10 are pointed and the GPS constellation visibility 39.

In FIG. 4(B), an inertially fixed axis that is pointed towards the zenith vector at one time will be aligned with the nadir vector a half orbit later. Even in the case of a nadir pointed spacecraft of FIG. 4(C), there may be transitional or contingency pointing modes where vehicle alignment is not fixed to one hemisphere.

Further, in the case of a vehicle in Low Earth Orbit (LEO), it is often advantageous to tilt the receiving antennas 10 with respect to each other to improve total coverage. In this case, the alignment of the antennas receiving GPS carrier signals must be taken into account when using GPS carrier signals to determine the attitude of the vehicle. However, prior art attitude determination systems using GPS carrier signals have not taken the alignment of the antennas into consideration in determining the attitude of the vehicle.

In "System and Method for Generating Attitude Determinations using GPS", U.S. Pat. No. 5,548,293 to Cohen, the use of a GPS receiver for determining the attitude of a moving vehicle in conjunction with four antennas mounted thereon is described. However, in the Cohen apparatus, all of the GPS antennas are pointed in the same direction, and therefore, look to the same part of the sky.

If the antennas, which exhibit coverage patterns of 180° (i.e., the antennas receive signals from or see through an angle of 180°), are on the ground, the antennas typically are pointed 180° away from the center of the earth and toward the sky (i.e., up), or within 35–45° of up. In the case where the antennas are on the ground, the alignment of the antennas is not an issue, because all of the antennas are pointed in the direction of the local vertical (or up), and there are a plurality of GPS signals broadcasts from the sky, but none from the ground.

FIG. 5(A) shows an example of a prior art antenna array 40 in which all antennas 10 are aligned with each other, and pointed in the same direction. FIG. 5(B) shows the coverage pattern 42 of the antenna array 40 in body coordinates shown in FIG. 5(A). The lighter shades of the coverage pattern 42 shown in FIG. 5(B) indicate regions with more common antenna 10 coverage.

To ensure that at least one antenna 10 is favorably aligned with the GPS constellation 39 (as shown in FIGS. 4(A)–4(C)), regardless of vehicle orientation, the antennas must be pointed in different directions, as shown in FIGS. 5(C) and 5(E).

To provide a larger GPS signal coverage area, nonaligned antennas 10 are provided, as shown in each of FIGS. 5(C) and 5(E). FIGS. 5(C) and 5(D) show, respectively, an antenna array 44 having 4 nonaligned antennas 10 used for navigation, but not for attitude determination, and the coverage pattern 42 thereof. Nonaligned antennas are antennas pointing in different directions.

Further, FIGS. 5(E) and 5(F) show, respectively, an antenna array 44 having 4 nonaligned antennas 10 used for navigation, but not for attitude determination, and the coverage pattern 42 thereof.

The nonaligned antenna configurations shown in FIGS. 5(C) and 5(E) will also greatly reduce the common field of view between each antenna pair. but would provide greater sky coverage for the antenna array.

The nonaligned antenna configurations shown in FIGS. 5(C) and 5(E) will provide for vehicle navigation solution availability regardless of vehicle orientation, but cannot be used for vehicle attitude determination based on differential carrier phase measurements between each of the nonaligned antennas because the measurements must be adjusted using the present invention to account for the phase contribution due to the circular polarization of the nonaligned antennas. This effect is common mode on aligned antennas shown in FIG. 5(A), and therefore has not been previously accounted for.

In *Maintaining GPS Positioning in Steep Turns Using Two Antennas*, D. H. Lawrence, et al., ION GPS-95, Palm Springs, Calif., September 1995, a derivation of a correction term for nonaligned antenna boresights was applied to absolute carrier phase positioning, but not to differential carrier phase for attitude determination.

Because the antennas 10 shown in FIGS. 5(C) and 5(E) are not aligned with each other, the antennas 10 shown therein cannot be relied upon, without the present invention, for determining vehicle attitude using GPS carrier signals, as explained below.

As shown in FIG. 6, the GPS signal 11 broadcast by satellite 12 is received by antenna 10 at an offset angle θ. The effect of the angle θ is removed from the differential carrier phase measurement 20 because antennas 10 are aligned with each other and pointed in the same direction relative to, and are at a great distance from, GPS signal 11, in the conventional system.

A problem with the prior art arises when the offset angle θ, discussed herein above with respect to FIG. 6, is not the same for each antenna receiving the GPS carrier signal, and, accordingly, is not removed during calculation of the differential carrier phase explained above. FIGS. 5(C) and 5(E) each show examples of nonaligned antennas in which the offset angle θ would not be the same for each antenna in the array, and, accordingly, would not be removed during conventional calculation of the differential carrier phase.

A problem with the prior art is that the effect of antenna alignment on differential carrier phase measurements is neglected.

A problem of nonalignment of antennas 10 is that the right hand circularly polarized (RHCP) antenna phase pattern is not common mode and must be modeled to produce correct differential carrier phase measurements.

A further problem in the prior art is that differential carrier phase measurements from the nonaligned antennas cannot be used for attitude determination, accordingly decreasing the useful results from the nonaligned antennas.

Another problem with the conventional method of determining vehicle attitude arises when a vehicle relies upon signals broadcast from a GPS satellite, since a vehicle such as a spacecraft is orbiting the earth very quickly, and the definition of "up" toward the satellites broadcasting the GPS signals changes. FIGS. 4(A) through 4(C), previously explained, illustrate the relative orientation of antennas 10 to GPS satellites 12 (not shown in FIGS. 4(A) through 4(C), but which are in GPS constellation 39).

Still another problem with the prior art is that a single, uniform set of attitude determination algorithms is not provided that supports all of the very different applications of a Low Earth Orbit (LEO) satellite.

STATEMENT OF INVENTION

The present invention solves the above-mentioned problems of providing nonaligned antennas on a vehicle to determine the attitude of the vehicle using GPS signals, and of taking into account the respective orientations of the antennas relative to each other and to the GPS signals being broadcast.

An object of the present invention is to use a differential phase measurement of GPS signals received by antennas on a vehicle to allow for the determination of the attitude of the vehicle, without requiring the vehicle be oriented in a particular direction.

A further object of the present invention is to provide the capability of determining an attitude of a vehicle using GPS carrier signals by providing correction terms for differential phase measurements of GPS carrier signals received from nonaligned antennas.

Another object of the present invention is to provide antennas to receive GPS signals which are not required to be aligned with each other and which can be used in conjunction with each other to determine an attitude of a vehicle.

Still a further object of the present invention is to correct the differential phase angle of the GPS signals received by antennas.

A further object of the present invention is to extend fully the GPS attitude determination capability to spacecraft, regardless of vehicle orientation.

Another object of the present invention is to establish the foundation for robust attitude determination on most dynamic platforms, regardless of the vehicle pointing profile.

A further object of the present invention is to provide a set of corrections based on nonaligned antennas to attitude determination algorithms developed specifically for the spacecraft dynamic environment.

A still further object of the present invention is to provide a single, uniform set of attitude determination algorithms that supports all vehicles no matter whether the vehicle is Earth referenced, inertially referenced, or spinning.

Still another object of the present invention is to generalize GPS carrier phase-based attitude determination to nonaligned antenna arrays through the calculation of a previously unquantified Right Handed Circularly Polarized (RHCP) effect on the differential phase measurement.

A further object of the present invention is to develop a set of attitude determination algorithms that provide high measurement integrity, availability, and continuity, with substantial autonomy and versatility for many applications, at acceptable performance and reliability.

To accomplish the above-mentioned objects, the present invention is a method of, and apparatus for, allowing a nonaligned antenna array to be used for vehicle attitude determination by removing the effects of the circularly polarized carrier phase of the GPS signals received by antennas on a vehicle. The present invention allows GPS antennas to be pointed in different directions and still determine the attitude of a vehicle using the antennas.

Also to accomplish the above-mentioned objects, the present invention provides GPS carrier phase differential correction for multiple antennas distributed on a vehicle in such a manner that some of the antennas will always be able to receive GPS signals. In a preferred embodiment of the present invention, at least eight antennas are used. In another embodiment of the present invention, GPS carrier phase differential correction is provided for four antennas placed on a vehicle, and rotated through 450 angles.

In a preferred embodiment, the present invention is implemented in software embedded inside of a GPS receiver, but could also be implemented on a computer executing post processing software. In the present invention, the GPS carrier phase differential is measured and determined using conventional GPS hardware discussed below, and the measured carrier phase differential is corrected using the method of the present invention. Although antennas in the present invention are not rotated physically, the method of the present invention determines through software a correction term to be removed from the GPS measurement.

The present invention, therefore, is a computer-based, embedded software apparatus which compensates for the relative directions in which each of a plurality of antennas receiving GPS signals are oriented, allowing nonaligned antennas to be used for vehicle attitude determination.

The present invention provides a plurality of antennas on a vehicle, receives GPS carrier phase signals by the antennas, then corrects the differential carrier phase taking into account the nonaligned antenna array receiving GPS carrier signals. Then, the attitude of the vehicle is calculated using the corrected differential carrier phase signals provided by the present invention.

Therefore, the present invention is a method for determining a correction to a differential phase measurement used for GPS attitude determination on nonaligned antenna arrays. The present invention determines the foregoing correction by determining a carrier phase angle received by each antenna, and correcting the measurement for phase angle and for the right-hand circular polarization effect from the nonaligned antennas.

Examples in which nonaligned antennas are useful include spacecraft that are spinning, inertially pointed, or tumbling, or in terrestrial vehicles which include nonaligned antennas.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 11(A) and 11(B) are diagrams of roving master antenna configurations;

FIGS. 12(A) and 12(B) are diagrams of Differential Phase Measurements from 4 Antennas, using the Master-Slave Antenna Method, and the All in View Antenna Method;

DETAILED DESCRIPTION OF THE INVENTION

Figure 7:
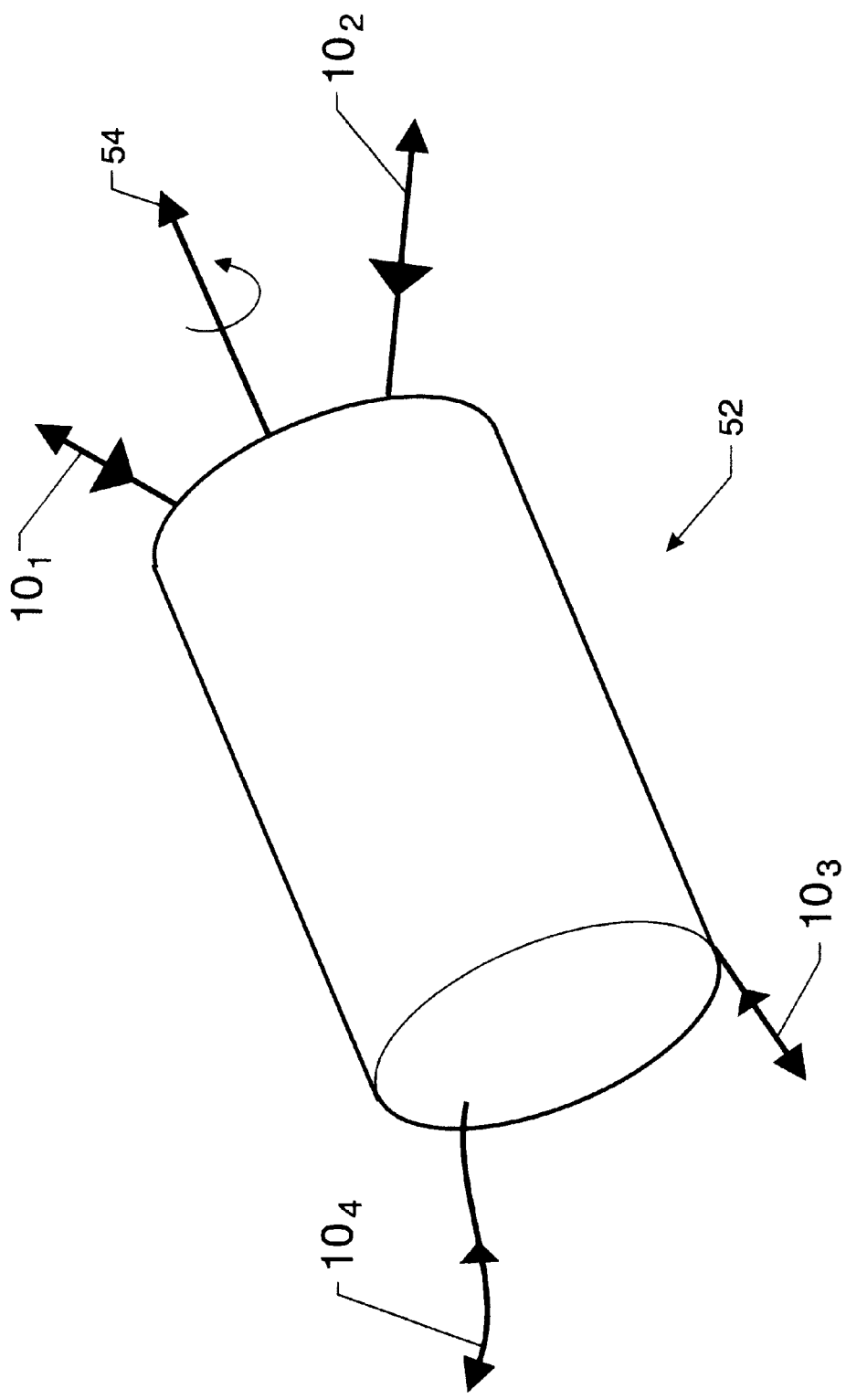
FIG. 7 is a diagram of a spacecraft with 4 Nonaligned GPS Patch Antennas.

FIG. 7 shows an example of a vehicle in which the present invention would allow nonaligned antennas to be used for attitude determination of the vehicle. The satellite 52 shown in FIG. 7 includes 4 nonaligned GPS Patch Antennas $10_1$ through $10_4$. As shown in FIG. 7, the satellite 52 telescope axis 54 which is inertially fixed, and 4 antennas $10_1$ through $10_4$. In addition, the satellite 52 rolls at approximately 3 rpm. In the satellite 52, each cone indicates a patch antennas field of view. An example of a satellite 52 which includes 4 nonaligned GPS Patch Antennas, and in which the present invention would allow nonaligned antennas to be used for attitude determination, as in FIG. 7 is discussed in H. U. Uematsu, B. W. Parkinson, and E. G. Lightsey, "GPS Receiver Design and Requirement Analysis for the Stanford Gravity Probe B Relativity Mission," ION GPS-95, Palm Springs, Calif., September 1995.

Figure 1:
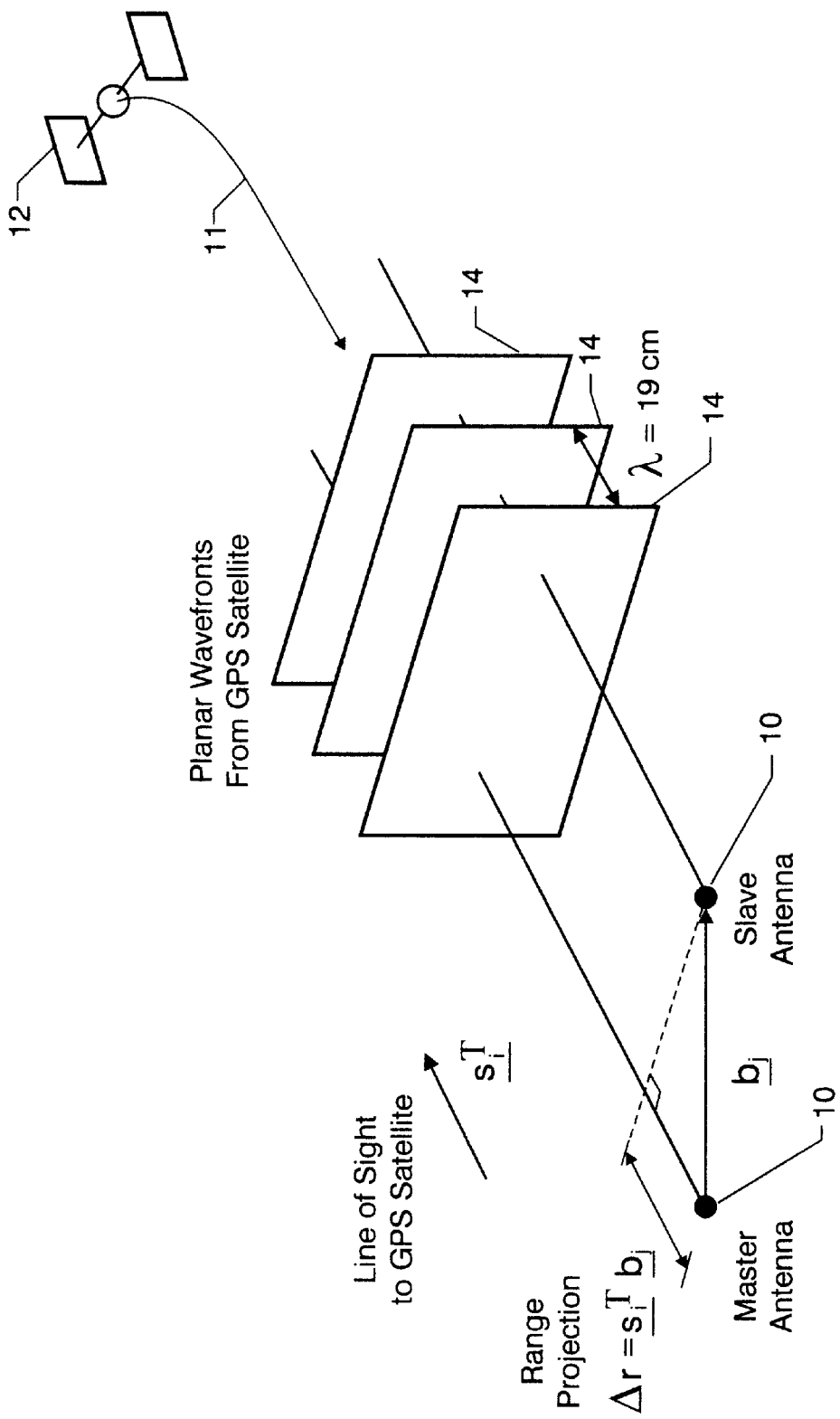
FIG. 1 is a diagram of an example of a Carrier Phase Interferometry Method of Attitude Determination of the prior art.
Figure 2:
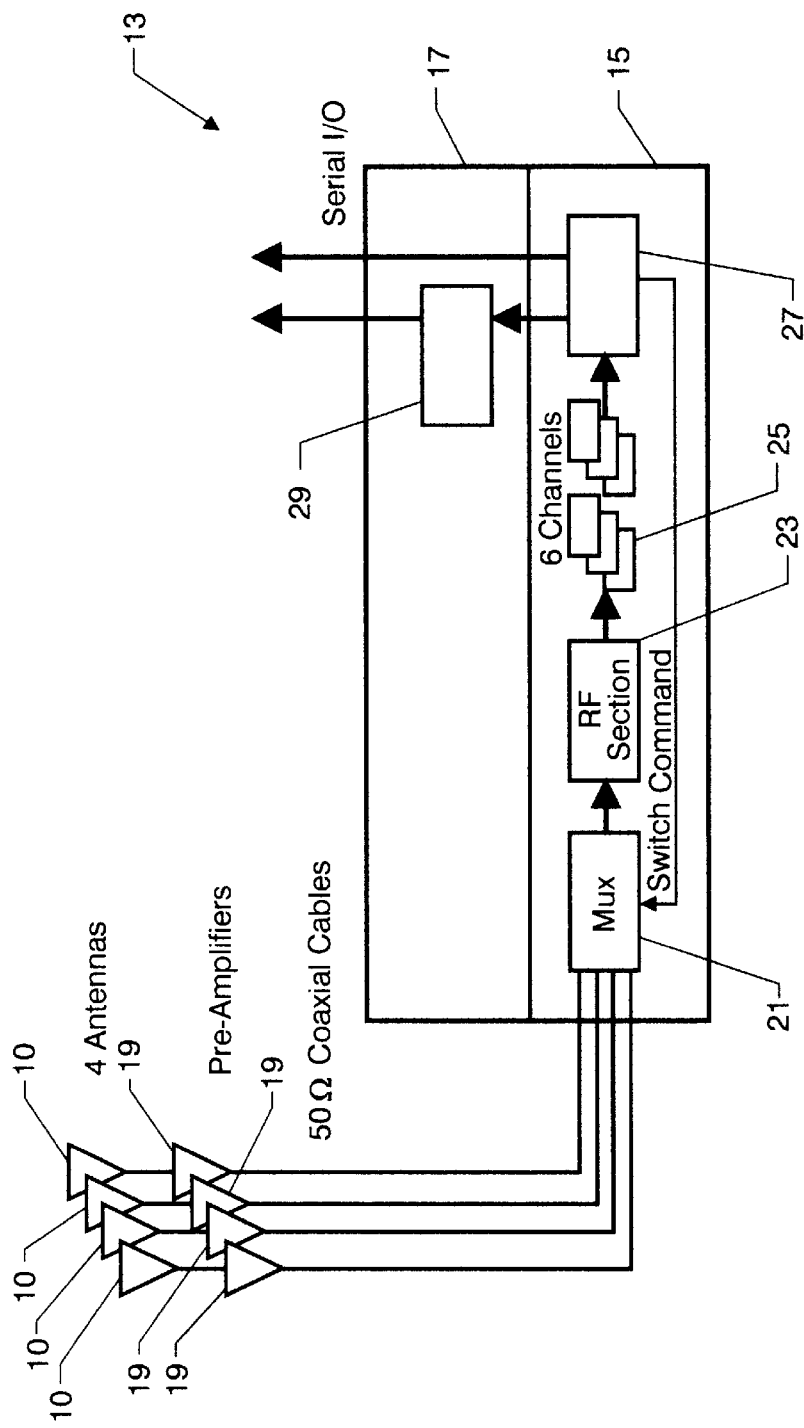
FIG. 2 is a diagram of a 6-Channel, 4-Antenna Multiplexing Receiver of the prior art.
Figure 3:
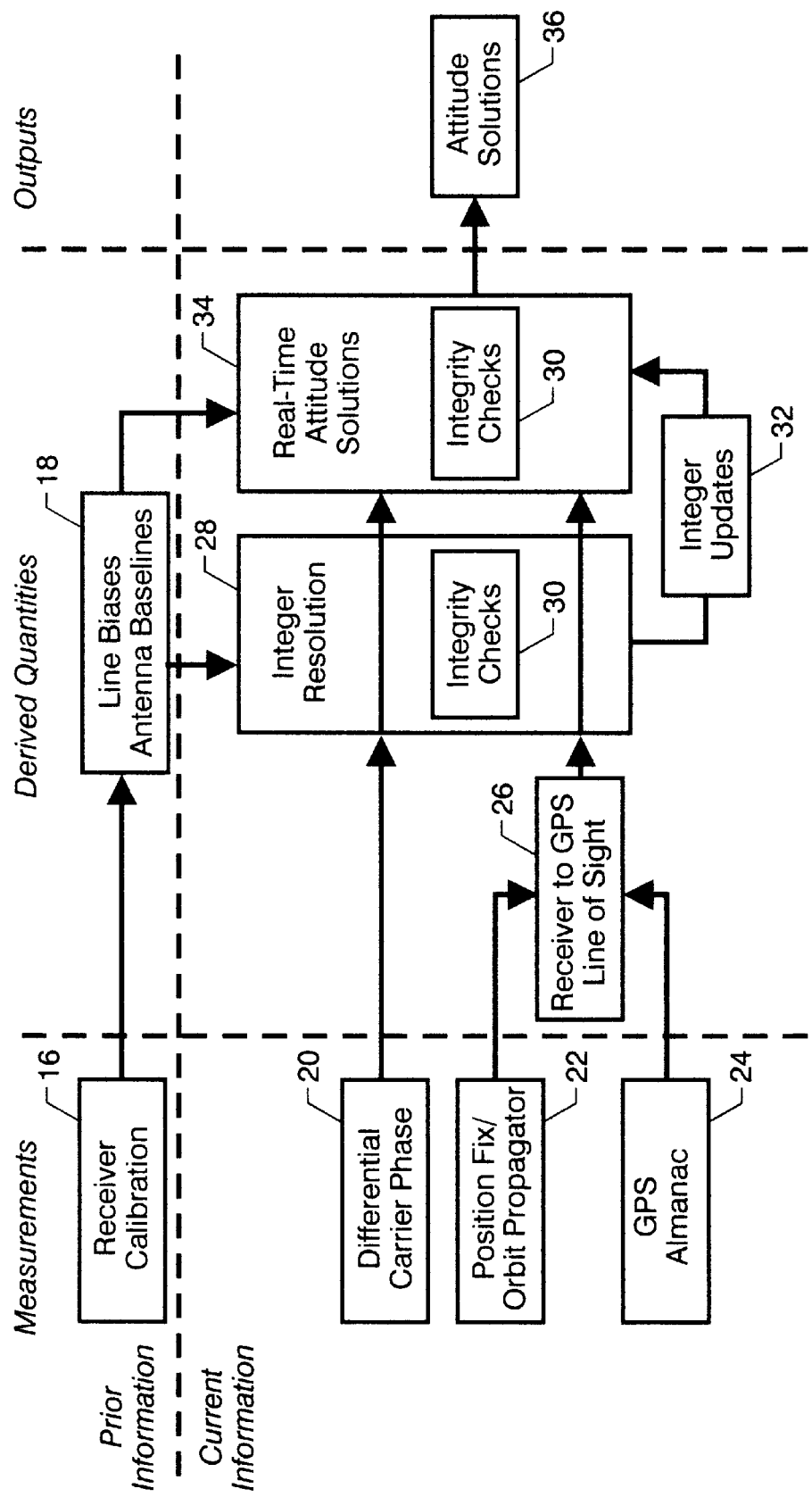
FIG. 3 is a GPS Attitude Determination Information Flow Diagram of the prior art.
Figure 4:
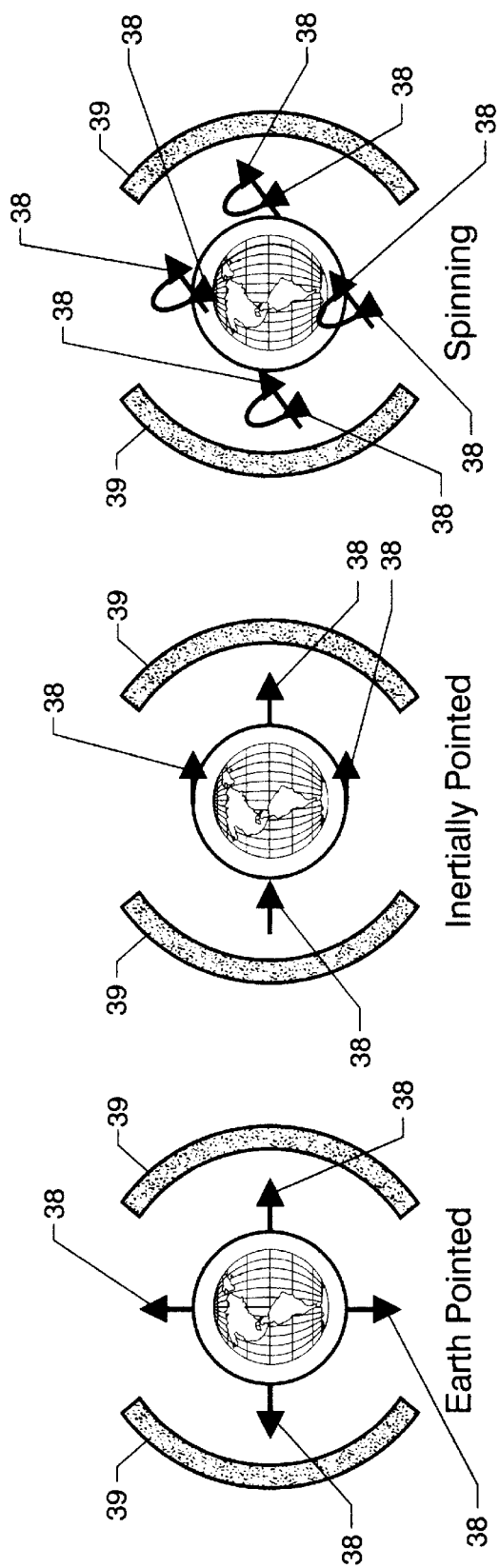
FIGS. 4(A), 4(B), and 4(C) are diagrams of Pointing Profiles for a Spacecraft.
Figure 5:
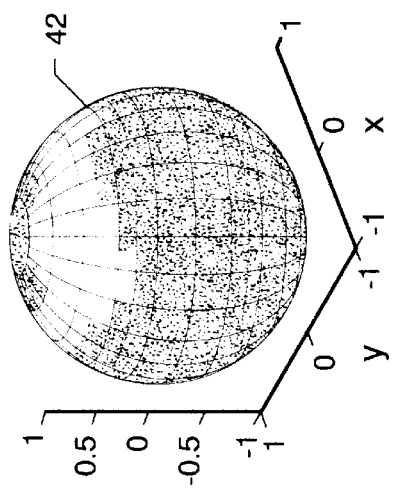
FIGS. 5(A), 5(B), 5(C), 5(D), 5(E), and 5(F) are diagrams of different antenna array geometries and their respective coverage patterns in body coordinates.
Figure 5:
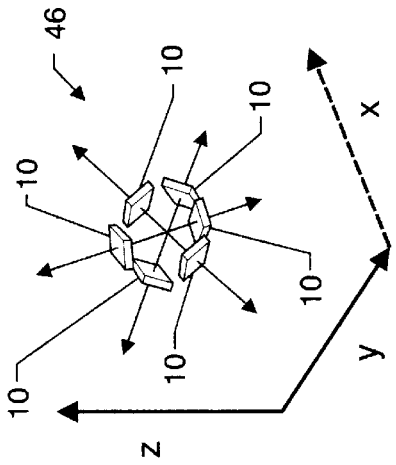
Figure 5:
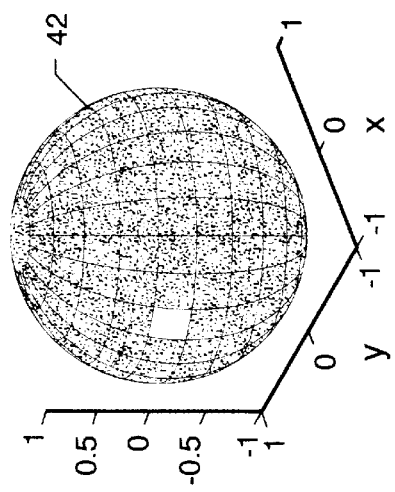
Figure 5:
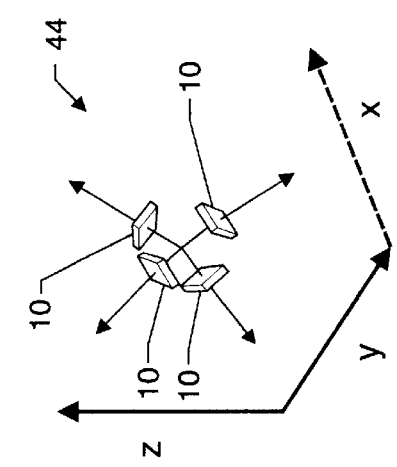
Figure 5:
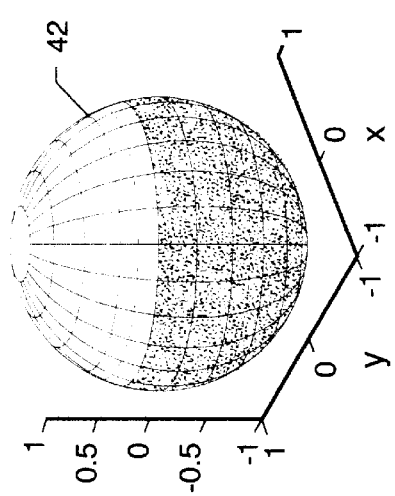
Figure 5:
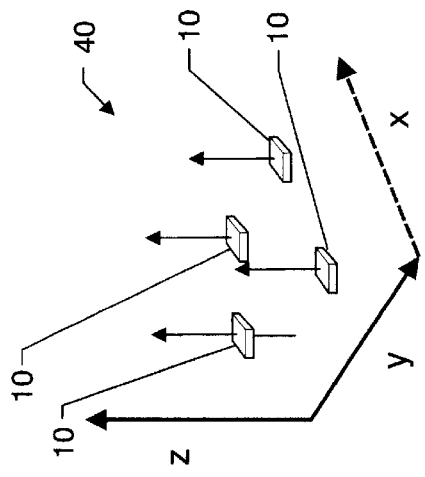
Figure 6:
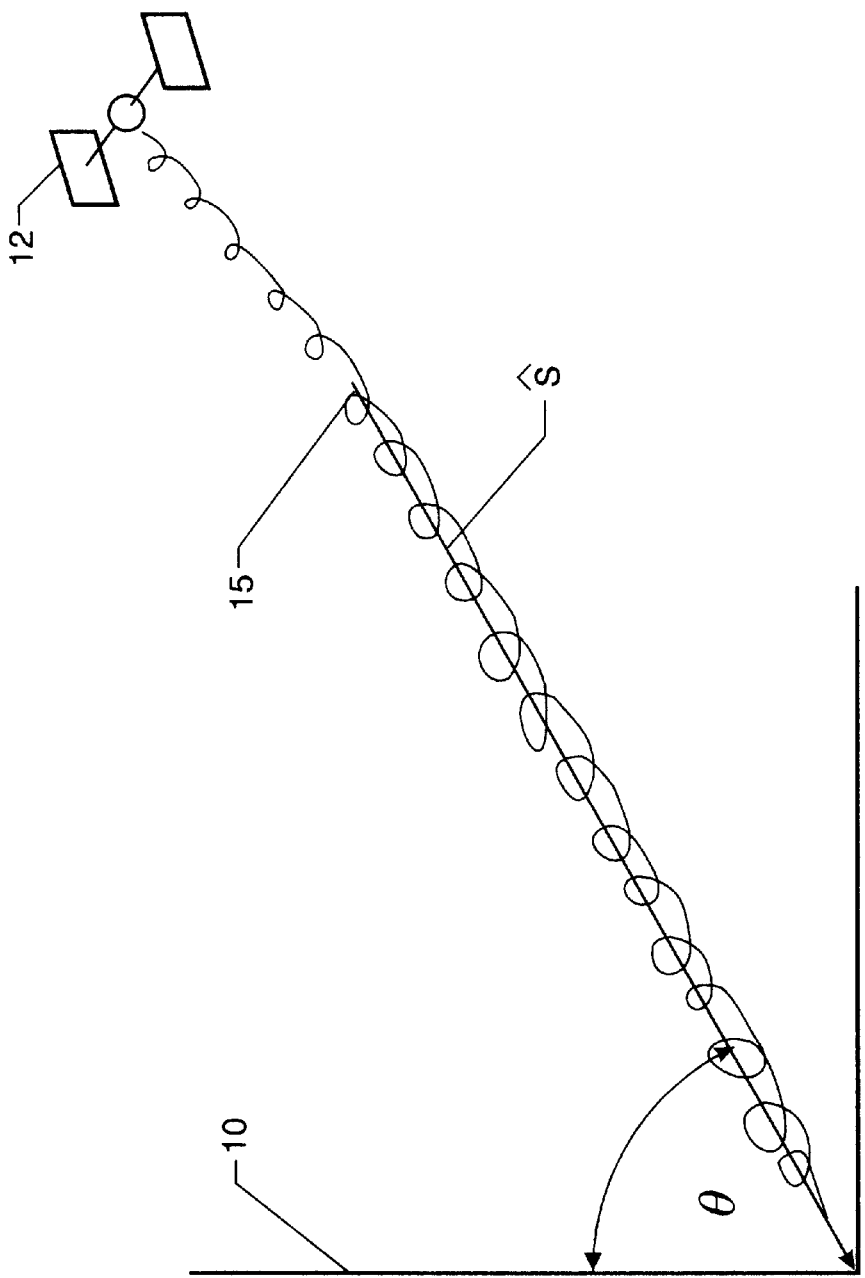
FIG. 6 is a diagram of an incidence angle of a circularly polarized signal with an antenna, in the related art.

Without the use of the present invention, though, the 4 antennas 10 on the satellite 52 shown in FIG. 7 could not be used to determine the attitude of the satellite 52 based on the differential phase measurement of the GPS carrier signals received by antennas 10. Likewise, without the use of the present invention, the nonaligned antenna arrays shown in FIGS. 5(C) and 5(E) could not be used for differential carrier phase-based attitude determination. However, with the use of the present invention, the nonaligned antenna arrays shown in FIGS. 5(C), 5(E), and 7 all could be used for differential carrier phase-based attitude determination.

Although FIG. 7 shows satellite 52, and the below-mentioned description of the present invention is presented using GPS carrier signals, the use of the present invention is applicable to any unit, terrestrial or space, having nonaligned antennas receiving circularly polarized carrier signals, whether GPS-broadcast or another type, to determine the attitude of the unit. In addition, the present invention may be implemented on a unit having aligned antennas; however, the greater benefit of the present invention is derived by a unit having nonaligned antennas.

In a preferred embodiment of the present invention, a unit or vehicle for which attitude determination is being performed would include at least 8 nonaligned antennas, providing relatively more antennas with the ability to receive the same GPS signal. By providing relatively more antennas to receive the same GPS signal, a vehicle would allow relatively more differential carrier phase measurements to be made and corrected by the present invention, and, therefore, a more accurate determination of the attitude of the vehicle.

Figure 8:
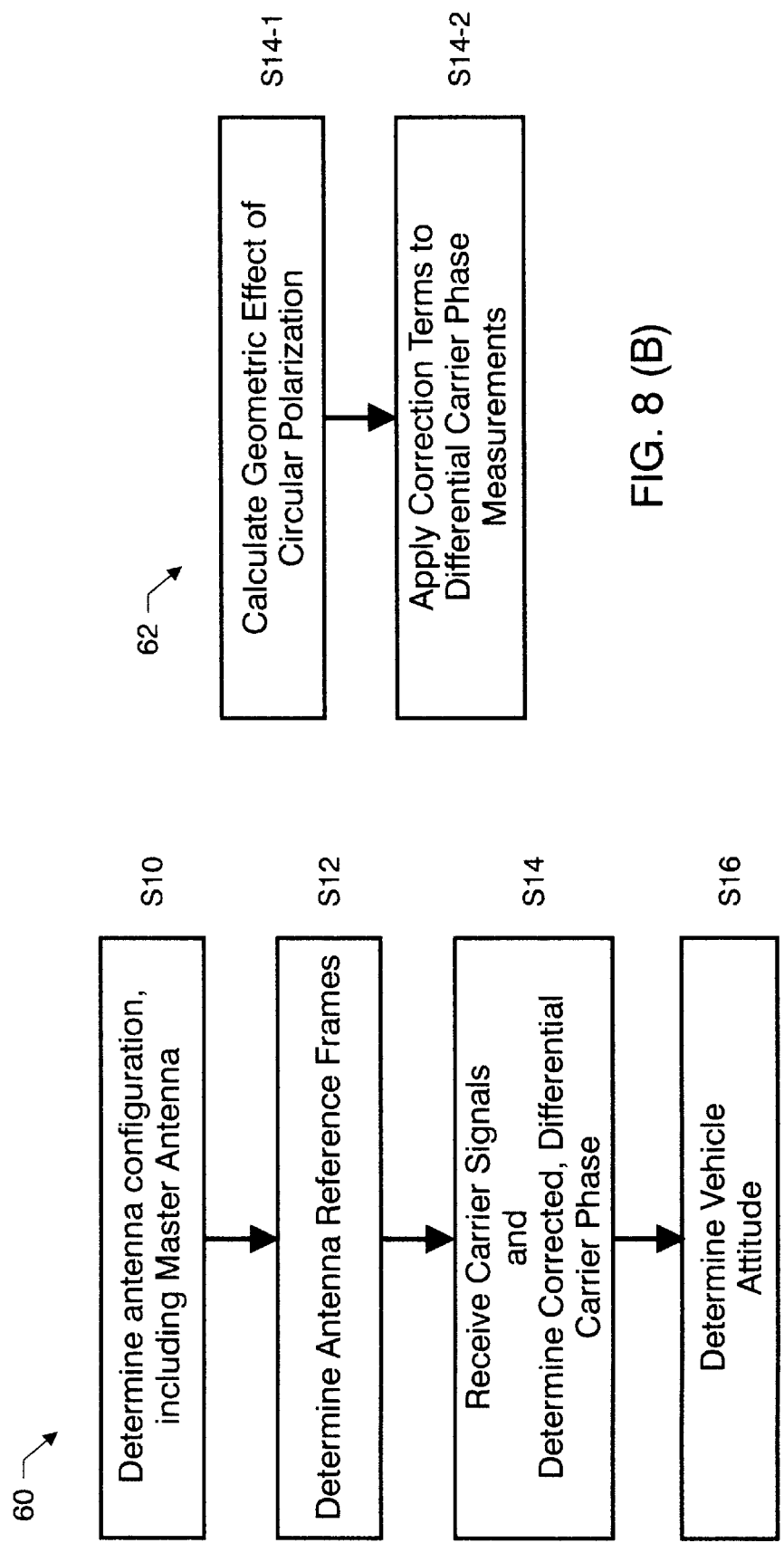
FIG. 8(A) is a flowchart for determination of the vehicle attitude using a corrected GPS signal carrier phase differential for a nonaligned antenna array of the present invention.
FIG. 8(B) is a flowchart of correcting differential carrier phase measurements for a nonaligned antenna array, in accordance with the present invention.

FIG. 8(A) is a flowchart 60 showing an overview of the method of the present invention. As shown in FIG. 8(A), in step S10, the antenna configuration on the vehicle, including the master antenna and the slave antennas, is conventionally determined, in accordance with FIGS. 11(A), 11(B), 12(A), and 12(B), below. Next, in step S12, the antenna reference frames are conventionally measured and stored, in accordance with Equation (18), below.

Figure 14:
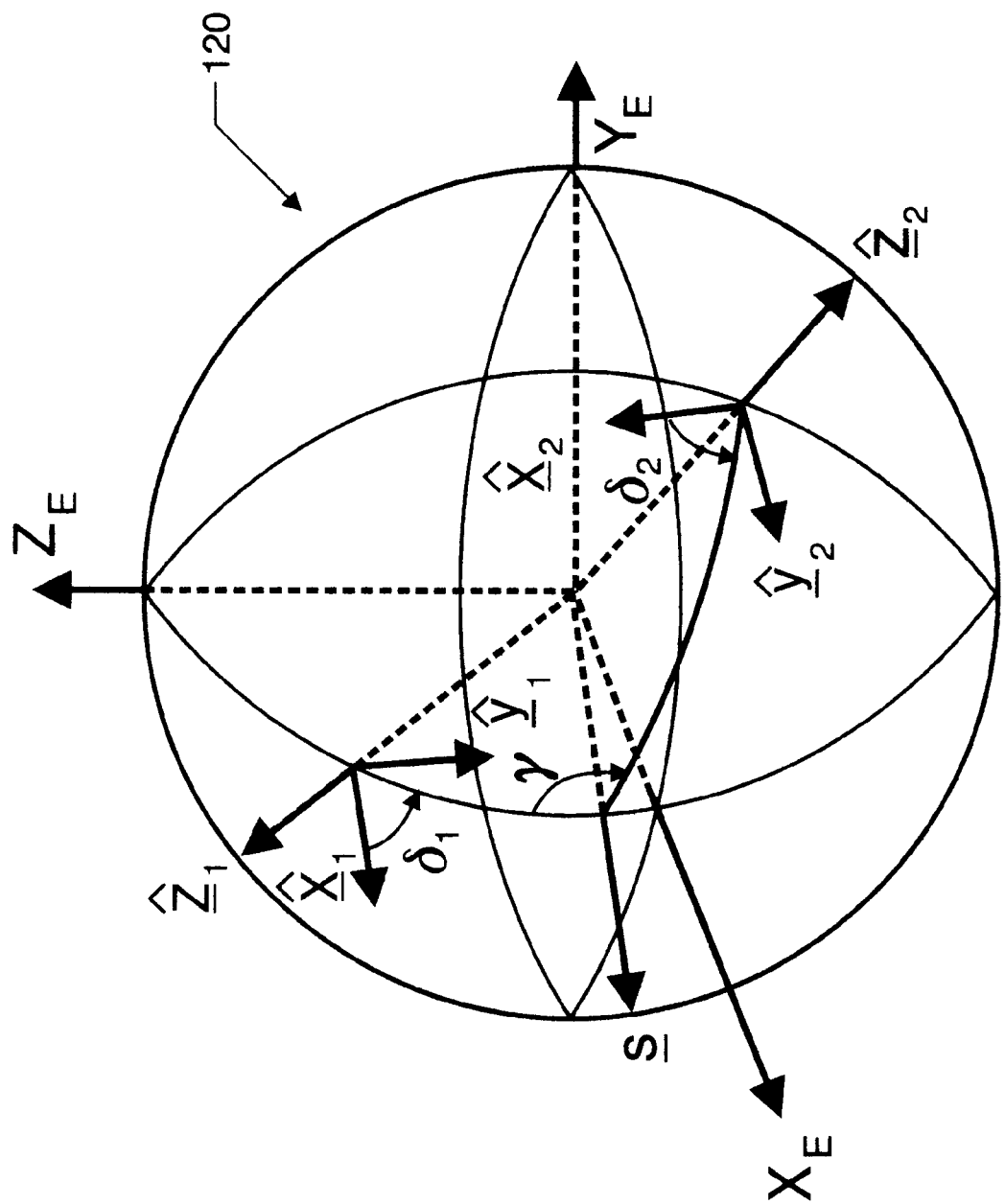
FIG. 14 is a diagram of geometry accounting for RHCP phase contribution to nonaligned antennas of the present invention.

In step S14, the carrier signals are received, and the corrected, differential carrier phase is determined for each set of carrier signals received by each set of antennas, in accordance with the present invention as shown in FIG. 14 and Equations (19) through (28), herein below.

The differential carrier phase measurements corrected in accordance with the present invention are then used in step S16 by conventional methods to determine vehicle attitude, with conventional and non-conventional cycle ambiguity resolution discussed in *Development and Flight Demonstration of a GPS Receiver for Space*, id. Non-conventional cycle ambiguity (or integer) resolution discussed in *Development and Flight Demonstration of a GPS Receiver for Space*, id., uses the Singular Value Decomposition Algorithm to determine the condition number of a cycle ambiguity resolution observation matrix as the ratio of the maximum and the minimum singular values, and then uses the condition number as a logical input for a feedback loop to select the best sample period and collection time for the Quasi-Static integer resolution algorithm.

Vehicle attitude determination is based not only on the corrected, differential carrier phase of the received GPS carrier signals, but, also on other necessary inputs such as the position of the vehicle, GPS almanac information, and receiver to GPS line of sight information, as explained herein with reference to Equations (5) through (13).

FIG. 8(B) is a flowchart 62 of determining corrected, differential carrier phase measurements for a nonaligned antenna array, in accordance with the present invention. Steps S14-1 and S14-2 shown in FIG. 8(B) are executed as part of step S14 of FIG. 8(A) and performed in accordance with the present invention, as explained in detail herein below.

In step S14-1, the geometry of the circular polarization (which is Right Hand Circular Polarization in the case of GPS carrier signals) of the received carrier signals is determined in accordance with the present invention, as explained herein below with respect to FIG. 14 and Equations (22) through (28).

In step S14-2, the correction terms are applied to each differential carrier phase measurement made, as explained below with respect to FIG. 14 and Equations (19) through (21), in the present invention, and the corrected differential carrier phase is determined, as shown in Equation (21).

Figure 9:
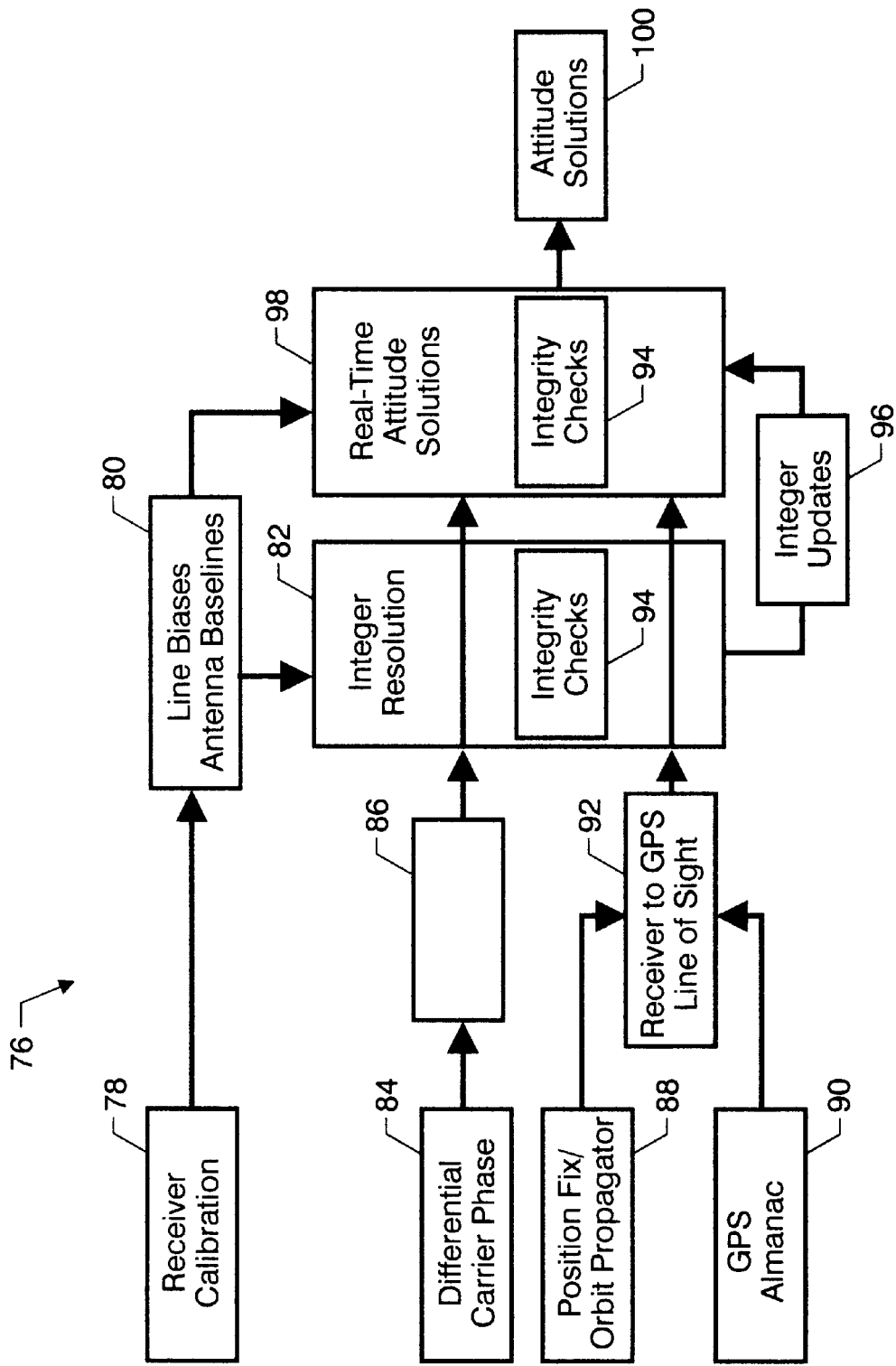
FIG. 9 is a diagram of software modules used for vehicle attitude determination of the present invention.

FIG. 9 is a diagram of an attitude determination software system 76 of the present invention. As shown in FIG. 9, receiver calibration 78 is input to line biases, and antenna baselines 80, which are input to an integer resolution unit 82. In addition, a differential carrier phase unit 84 receives the differential carrier phase measured and determined for the nonaligned antenna array and executes steps S10, S12, and the calculation of the uncorrected, differential carrier phase in step S14 of the above-mentioned software system 76. The uncorrected, differential carrier phase is input to the nonaligned antenna differential carrier phase correction unit 86, which executes the correction of the differential carrier phase in step S14 of FIG. 8(A), which includes steps S14-1 and S14-2 of FIG. 8(B). The corrected, differential carrier phase is transmitted from the nonaligned antenna differential carrier phase detection unit 86 to the integer resolution unit 82 and real-time attitude solutions unit 98, which executes step S16 of the above-mentioned flowchart 60. Also input to the integer resolution unit 82 and real-time attitude solutions unit 98 are outputs of the position/fix orbit propagator 88, the GPS Almanac 90, and the Receiver to GPS Line of Sight 92.

The Receiver calibration unit 78 conventionally calibrates the GPS receiver; the line biases, antenna baselines unit 80 conventionally corrects differential carrier phase measurements for the line biases and the antenna baselines for the antenna array; the differential carrier phase unit 84 conventionally determines the differential carrier phase of the received GPS carrier signals; the position fix/orbit propagator 88 conventionally determines the position fix; the GPS Almanac 90 conventionally provides the locations of the GPS satellites; and the Receiver to GPS Line of Sight unit 92 conventionally determines the receiver antenna array to GPS line of sight.

Then, as shown in FIG. 9, the Integer Resolution unit 82 resolves the cycle ambiguity as described in *Development and Flight Demonstration of a GPS Receiver for Space*, id., including integrity checks 94. Integer updates 96 and the result of the integer resolution are input to the real-time attitude solutions unit 98, which conventionally determines and outputs the attitude solutions 100, using the corrected GPS carrier phase differential as if it were from an aligned antenna array.

Figure 10:
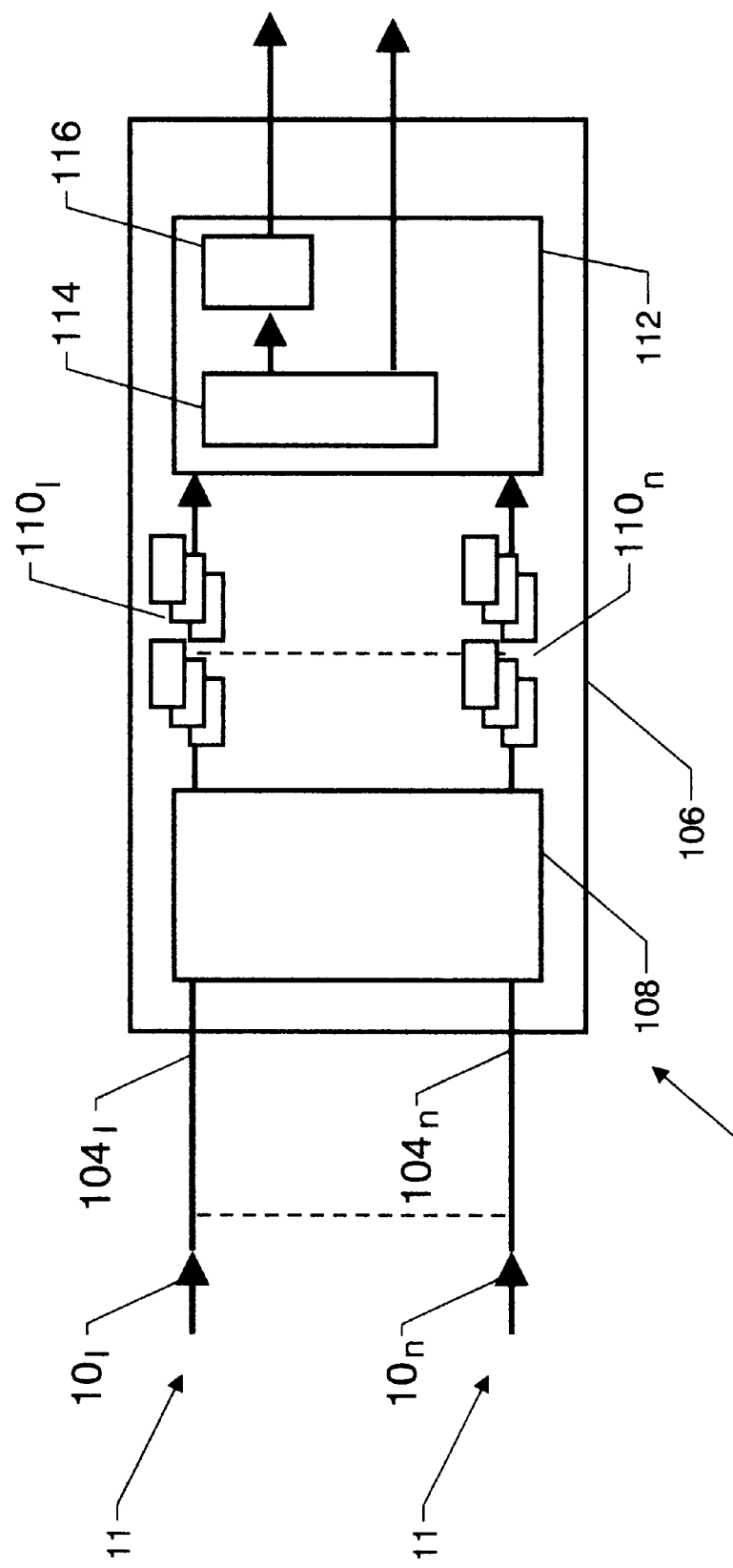
FIG. 10 is a diagram of a 48-channel, 8-antenna receiver executing the software modules of the present invention.

In a preferred embodiment of the present invention, a receiver 102 shown in FIG. 10 executes the above-mentioned attitude determination software system 76 of the present invention. As shown in FIG. 10, nonaligned antennas $10_1$ through $10_n$ receive GPS carrier signal 11, which is then amplified by pre-amplifiers $104_1$ through $104_n$, respectively. The carrier signal is then transmitted to carrier signal receiver unit 106, including conventional RF section 108, channels $110_1$ through $110_n$, and processor 112. Channels $110_1$ through $110_n$, respectively, transmit the received carrier signal to processor 112, for navigation determination by measurement and navigation module 114, and attitude determination by attitude module 116.

In particular, in determining the attitude of the vehicle, attitude module 116 executes steps S10 through S16 shown in FIG. 8(A), and steps S14-1 to S14-2 shown in FIG. 8(B). Therefore, consistent with the present invention, attitude module 116 calculates the geometric effect of the circular polarization of the carrier signals received by nonaligned antenna array 10, then applies the calculated correction terms to the differential carrier phase measurements.

In a preferred embodiment of the present invention, the number of nonaligned antennas (n) is at least 8, and there are 6 channels 110 per antenna 10, for a total of 48 channels. One channel per antenna 10 receives a carrier signal. Also in a preferred embodiment of the present invention, processor 112 comprises memory storing commands and data, and a microprocessor executing measurement and navigation module 114 and attitude module 116. Attitude module 116 comprises the above-mentioned attitude determination software system 76 of the present invention.

The nonaligned antenna configurations of the present invention, including the roving master antenna and the all in view carrier phase measurements configurations, are now discussed.

For a nonaligned antenna array, relationships between antennas must be established, in accordance with step S10 of FIG. 8(A). Conventional methods of establishing relationships between the antennas in a nonaligned antenna array include the roving master antenna method and the all in view method, both of which are explained below.

The roving master antenna is shown in FIGS. 11(A), 11(B), and 12(A). Many GPS patch antennas 10 may be effectively modeled as having a hemispherical gain pattern. When all antennas 10 are aligned, they have the same GPS signal visibility and gain. In this case a single master antenna may be chosen and fixed, since all GPS signals will present the same elevation angle to all antennas. For nonaligned antennas, the received signal strengths may vary considerably from antenna to antenna, and some antennas may not have visibility to a given GPS satellite. If all differential carrier phase measurements are made with respect to a common master antenna, the antenna with the strongest received signal is preferably used as the master antenna for each GPS satellite. This method will produce the most quality measurements, and is the preferred embodiment of the present invention.

Mathematically, the differential carrier phase measurements must be interpreted consistently, and the antenna baseline vectors must reflect the correct master antenna. When the master antenna changes as shown, for example, from that shown in FIG. 11(A) (in which antenna 1 ($10_1$) is the master antenna) to that shown in FIG. 11(B) (in which antenna 2 ($10_2$) is the master antenna), the differential phase and antenna baseline vectors are linear combinations of the previous case as follows:

$$\begin{bmatrix} \Delta\varphi_1 \\ \Delta\varphi_2 \\ \Delta\varphi_3 \end{bmatrix}_{ml} = \begin{bmatrix} \varphi_2 - \varphi_1 \\ \varphi_3 - \varphi_1 \\ \varphi_4 - \varphi_1 \end{bmatrix} \quad (15)$$

$$\begin{bmatrix} \Delta\varphi_1 \\ \Delta\varphi_2 \\ \Delta\varphi_3 \end{bmatrix}_{m2} = \begin{bmatrix} \varphi_1 - \varphi_2 \\ \varphi_3 - \varphi_2 \\ \varphi_4 - \varphi_2 \end{bmatrix}, \begin{bmatrix} \Delta\varphi_1 \\ \Delta\varphi_2 \\ \Delta\varphi_3 \end{bmatrix}_{m1} = \begin{bmatrix} -\Delta\varphi_1 \\ \Delta\varphi_2 - \Delta\varphi_1 \\ \Delta\varphi_3 - \Delta\varphi_1 \end{bmatrix}_{m2} \quad (16)$$

$$[\underline{b_1} \; \underline{b_2} \; \underline{b_3}]_{m1} = [-\underline{b_1} \; \underline{b_2} - \underline{b_1} \; \underline{b_3} - \underline{b_1}]_{m2} \quad (17)$$

Although Equation 16 demonstrates how differential carrier phase measurements are related to one another using an alternative master antenna, this extra differencing operation is not actually performed (which would increase the resultant measurement noise). Instead, the unmodified differential carrier phase measurements are interpreted separately using the antenna baseline vectors as defined in Equation 17. Once these changes are inserted in Equation 5 and equations for resolving cycle ambiguity described in *Development and Flight Demonstration of a GPS Receiver for Space*, id., the remainder of the attitude determination logic is performed the same as presented in the related art. However, the differential carrier phase measurements for nonaligned antennas would not have been corrected as in the present invention. Similar relations may be derived for the other possible master antennas combinations.

The end result of using a roving master antenna is that more valid measurements are taken from each GPS signal, since each signal may have a different master antenna—the antenna that provides the strongest signal to noise ratio. A software Schmitt trigger (not shown in FIG. 9) is added to prevent noisy switching between master antennas when the signal strengths are approximately equal on two or more antennas.

Alternatively, the all in view carrier phase measurements may be used. If the incoming carrier phase is measured independently at each antenna (rather than relative to a single master antenna), an all in view approach may be used to combine all possible permutations of differential phase measurements, as shown in FIG. 12(B). For n antennas, up to $n(n-1)/2$ differential phase measurements may be taken at a each sample using this method; this provides a significant increase in measurements when the number of antennas becomes large.

To provide attitude determination of a vehicle using received carrier signals, differential phase angle correction of the carrier signal received by nonaligned antennas must be performed, and is now described in accordance with the present invention.

Although the below-mentioned discussion is oriented to correcting differential carrier phase measurements from GPS signals, the present invention is applicable to correcting any circularly polarized signal received by nonaligned antenna arrays.

Figure 13:
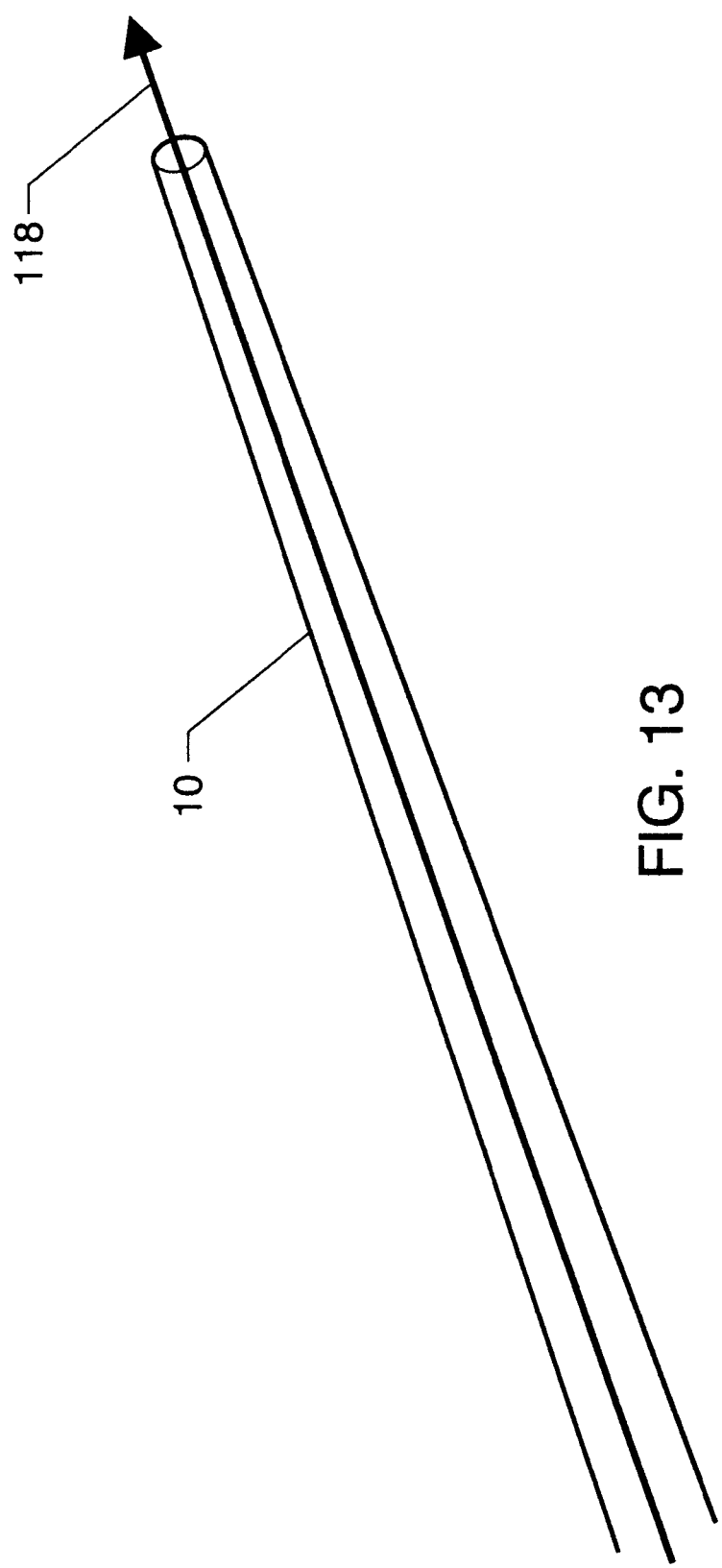
FIG. 13 is a diagram of an antenna boresight vector through the axis of symmetry of the antenna.

GPS signals are right hand circular polarized (RHCP) for broadcast through the ionosphere, which is seen by rotating an antenna counterclockwise about its boresight. The antenna boresight 118 ($a_j$) is the direction of the antenna 10 taken along a line parallel with the length of the antenna 10 and running through the center of the antenna 10 (the axis of symmetry), as shown in FIG. 13.

The received GPS carrier signal is seen to go through a positive phase angle change equal to the angle of rotation. When the receiving antenna is perpendicular to the direction of propagation of the GPS signal (0 degrees elevation), rotation about its boresight produces no change in the received signal.

For differential carrier phase measurements, this effect cancels out when the antennas are aligned with each other.

Even if the antennas are installed rotated about their boresights by a fixed angle, as long as the boresight vectors are aligned the resultant additional phase angle is a fixed value that may be calibrated out of the measurement with line bias.

When the antenna boresights are not aligned with each other, the nonalignment of the boresights must be modeled to produce accurate differential phase measurements, as discussed above. Attitude determination using differential carrier phase measurements is extended to nonaligned antenna arrays by the present invention.

In accordance with step S12 of FIG. 8(A), the antenna reference frames are determined, as discussed with respect to Equation (18), below.

Consider two antennas with boresight unit vectors, $\hat{z}_1$ and $\hat{z}_2$. These vectors form the z-axes of local antenna reference frames. Imagine x- and y-axis vectors attached to the in-plane components of the antennas to complete the definition of the local antenna reference frames. At the time of antenna array installation, the relationship between the two antenna reference frames is measured and stored as a known transformation matrix $\underline{\underline{A}}_{2>1}$, so that any vector $\underline{r}_2$ in the 2-antenna reference frame may be transformed to the 1-antenna reference frame:

$$\underline{r}_1 \underline{\underline{A}}_{2>1} \underline{r}_2 \quad (18)$$

For an aligned array, the $\underline{\underline{A}}_{2>1}$ matrix is identity. For a nonaligned antenna array, the $\underline{\underline{A}}_{2>1}$ matrix defines the relationship between the master (1) and slave (2) antenna reference frames. The master antenna reference frame is then defined to be (or is transformed back to) the vehicle body reference frame.

Then, the corrected, differential carrier phase measurements are determined in accordance with the present invention, as shown in step S14 of FIG. 8(A), and steps S14-1 and S14-2 of FIG. 8(B).

The geometry of the RHCP phase contribution to differential phase measurements for nonaligned antennas is shown in FIG. 14. The nonaligned antenna boresight vectors $\hat{z}_1$ and $\hat{z}_2$ are translated to the origin and shown with the GPS signal line of sight unit vector $\hat{s}$ as they pierce the unit sphere 120. The local antenna reference frames are completed with the vectors $\hat{x}_1$, $\hat{y}_1$, $\hat{x}_2$, and $\hat{y}_2$ drawn tangent to the sphere. Assume that the attitude of the vehicle with respect to the external reference frame, $\underline{\underline{A}}_{E>B}$, is known, so that all vectors can be represented in a single, consistent reference frame.

To calculate the correction term of the RHCP contribution applied to the differential phase measurement in accordance with the present invention as described in step S14 of FIG. 8(A) and step S14-2 of FIG. 8(B), consider that a right-handed rotation about the boresight 116 of an antenna 10 increases the phase measurement by the magnitude of the rotation, whereas a rotation normal to the antenna boresight does not change the phase measurement. Begin by rotating antenna $10_1$ about its boresight vector through the right-handed angle $\delta_1$ so that the x-axis points along the great circle to $\hat{s}$. The phase angle measured at antenna $10_1$ is increased by $\delta_1$ radians. Rotate the antenna boresight $\hat{z}_1$ along the great circle so that it coincides with $\hat{s}$. Because the rotation is normal to antenna boresight, the phase measurement at antenna $10_1$ is unchanged.

Now rotate antenna $10_2$ about its boresight vector through the right-handed angle $\delta_2$ so that the x-axis points along the great circle to $\hat{\underline{s}}$. The phase angle measured at antenna $10_2$ is increased by $\delta_2$ radians. Rotate the antenna boresight $\hat{\underline{z}}_2$ along the great circle so that it coincides with $\hat{\underline{s}}$. Because this rotation is normal to antenna boresight, the phase measurement at antenna $10_2$ is unchanged.

The x- and y-axes of antennas $10_1$ and $10_2$ are now separated by the angle $\gamma$ while the boresight vectors of both antennas point along the line of sight vector $\hat{\underline{s}}$. To complete the calculation, rotate antenna $10_2$ about its boresight vector through the angle $\gamma$ to bring the antennas to a common reference. The phase measurement at antenna $10_2$ is increased by $\gamma$ radians.

Summarizing, antenna $10_1$ was rotated through the angle $\delta_1$ and antenna $10_2$ was rotated through the angle $\delta_2+\gamma$ to be brought to a common reference:

$$(\phi_1)_c = (\phi_1)_u + \delta_1 \tag{19}$$

$$(\phi_2)_c = (\phi_2)_u + \delta_2 + \gamma \tag{20}$$

$$(\phi_2-\phi_1)_c = (\phi_2-\phi_1)_u + \delta_2 + \gamma - \delta_1 \tag{21}$$

This is a real addition to the differential carrier phase measurement due solely to the RHCP effect of the transmitted signal.

To calculate the geometric effect of the right hand circular polarization from known quantities in accordance with the present invention as described in step S14 of FIG. 8(A) and step S14-1 of FIG. 8(B), first specify the direction of rotation of $\delta_1$ to be normal to $\hat{\underline{z}}_1$ and $\hat{\underline{s}}$:

$$\hat{\underline{r}}_1 \equiv \frac{\hat{\underline{z}}_1 \times \hat{\underline{s}}}{\|\hat{\underline{z}}_1 \times \hat{\underline{s}}\|_2} \tag{22}$$

Then define the pointing vector from $\hat{\underline{z}}_1$ to $\hat{\underline{s}}$ to be normal to $\hat{\underline{z}}_1$ and $\hat{\underline{r}}_1$:

$$\hat{\underline{p}}_1 \equiv \frac{\hat{\underline{r}}_1 \times \hat{\underline{z}}_1}{\|\hat{\underline{r}}_1 \times \hat{\underline{z}}_1\|_2} \tag{23}$$

The rotation angle $\delta_1$ is then given by:

$$\delta_1 = [\cos^{-1}(\hat{\underline{x}}_1 \cdot \hat{\underline{p}}_1)][\text{sgn}((\hat{\underline{x}}_1 \times \hat{\underline{p}}_1) \cdot \hat{\underline{z}}_1)] \tag{24}$$

which can be expressed in terms of fundamental quantities as:

$$\delta_1 = \left[\cos^{-1}\left(\frac{\hat{\underline{x}}_1 \cdot \hat{\underline{s}}}{\|\hat{\underline{s}} - (\hat{\underline{z}}_1 \cdot \hat{\underline{s}})\hat{\underline{z}}_1\|_2}\right)\right][\text{sgn}((\hat{\underline{x}}_1 \times \hat{\underline{s}}) \cdot \hat{\underline{z}}_1)] \tag{25}$$

Likewise:

$$\delta_2 = \left[\cos^{-1}\left(\frac{\hat{\underline{x}}_2 \cdot \hat{\underline{s}}}{\|\hat{\underline{s}} - (\hat{\underline{z}}_2 \cdot \hat{\underline{s}})\hat{\underline{z}}_2\|_2}\right)\right][\text{sgn}((\hat{\underline{x}}_2 \times \hat{\underline{s}}) \cdot \hat{\underline{z}}_2)] \tag{26}$$

$\gamma$ is the angle between the two pointing vectors $\hat{\underline{p}}_1$ and $\hat{\underline{p}}_2$:

$$\gamma = [\cos^{-1}(\hat{\underline{p}}_2 \cdot \hat{\underline{p}}_1)][\text{sgn}((\hat{\underline{p}}_2 \times \hat{\underline{p}}_1) \cdot \hat{\underline{s}})] \tag{27}$$

The form of this equation in terms of fundamental quantities is more involved, but evaluates easily:

$$\gamma = \left[\cos^{-1}\left(\frac{1 + (\hat{\underline{z}}_1 \cdot \hat{\underline{s}})(\hat{\underline{z}}_2 \cdot \hat{\underline{s}})(\hat{\underline{z}}_1 \cdot \hat{\underline{z}}_2) - (\hat{\underline{z}}_1 \cdot \hat{\underline{s}})^2 - (\hat{\underline{z}}_2 \cdot \hat{\underline{s}})^2}{\|\hat{\underline{s}} - (\hat{\underline{z}}_1 \cdot \hat{\underline{s}})\hat{\underline{z}}_1\|_2 \|\hat{\underline{s}} - (\hat{\underline{z}}_2 \cdot \hat{\underline{s}})\hat{\underline{z}}_2\|_2}\right)\right] \tag{28}$$

$$[\text{sgn}((\hat{\underline{z}}_2 \cdot \hat{\underline{s}})(\hat{\underline{z}}_1 \cdot \hat{\underline{s}})[(\hat{\underline{z}}_2 \times \hat{\underline{z}}_1) \cdot \hat{\underline{s}}])]$$

Equations 24 through 28 are well defined at all points except when any two of the three vectors $\hat{\underline{z}}_1$, $\hat{\underline{z}}_2$ and $\hat{\underline{s}}$ are parallel, which is a condition that may be tested before attempting to apply these equations.

The primary obstacle to applying these equations directly to the carrier phase measurement in Equation 21 is that the attitude of the vehicle, $A_{E>B}$, is embedded in the expressions of the antenna reference frames. A circular condition arises in that to calculate the attitude it is necessary to know the RHCP correction, but to calculate the RHCP correction the attitude must be known. If the attitude of the vehicle is already approximately known, perhaps from a prior estimate, the RHCP effect may be estimated and then iterated along with a new attitude solution to convergence. If there is no prior estimate of attitude, an estimate may be constructed from other means, such as the line of sight vector along each antenna to the strongest GPS signal received on that antenna.

With the equations established to calculate the RHCP effect on differential carrier phase measurements for non-aligned antenna arrays, the above-mentioned GPS receiver employs these corrections to perform attitude determination with nonaligned antenna arrays. As has been discussed, this augmentation of the GPS attitude determination algorithms is critical for the generalization of this capability to all types of spacecraft pointing applications.

Further considerations in using corrected, differential carrier phase measurements received from a nonaligned antenna array to determine vehicle attitude in connection with step S16 of FIG. 8(A) are now discussed.

Greater sky coverage of a nonaligned antenna array comes at the expense of common field of view between antennas. Since a common view to a GPS signal between two or more antennas is the basis of GPS attitude determination, the question of whether a nonaligned antenna array will have enough differential carrier phase measurements must be addressed. On the basis of previous experience with other spacecraft experiments such as the RADCAL satellite, and as explained in *Development and Flight Demonstration of a GPS Receiver for Space*, id., approximately 8 or more valid differential phase measurements are necessary for reliable attitude determination (C. E. Cohen, E. G. Lightsey, W. A. Feess, B. W. Parkinson, "Space Flight Tests of Attitude Determination Using GPS," Intl. Journal of Satellite Communications, Vol. 12, 1994), taking into account GPS signal visibility including Earth occultation and elevation angle with respect to the antenna boresight vector, navigation and attitude tracking availability versus pointing profile and antenna geometry, a particular orbit, an antenna array on inertially fixed vehicle, and an antenna array on a spinning vehicle. The foregoing differential phase measurements were made without correcting the differential phase measurements in accordance with the present invention explained herein above.

Although the results of "Space Flight Tests of Attitude Determination Using GPS," id. (the study), indicate that 6 antennas and 12 channels per antenna would provide 100% coverage, the study was performed under ideal conditions, and using post-processed results. In most instances, 6 or less GPS satellites are in view at any given moment. Therefore, the preferred embodiment of at least 8 antennas (and 6 channels per antenna) will provide coverage for navigation and attitude determination, regardless of orientation, for most Low Earth Orbit spacecraft.

The benefit of the present invention is that, particularly with a receiver capable of processing 8 or greater antenna inputs and possessing 6 or more channels per antenna, continuous attitude determination and navigation is provided at all times in orbit, regardless of the pointing mode of the vehicle, even if the vehicle is out of control and tumbling. A robust system of attitude determination could be potentially used as a backup or safe hold sensor to provide critical spacecraft pointing and navigation functions at all times.

The present invention allows for measurements on nonaligned antenna arrays, providing measurement continuity and availability regardless of vehicle orientation. The present invention is versatile, with the same set of algorithms being able to work on Earth-pointed, inertially-pointed, and spinning payloads in LEO. The performance of the attitude determination is typical of prior art GPS carrier phase systems using aligned antennas.

Although examples of nonaligned antenna arrays discussed herein above included 8 antennas, the present invention is applicable to an array of any number of nonaligned antennas.

A test array was developed to validate the effects of the RHCP of the carrier signal on GPS based attitude determination using nonaligned antennas, as discussed in *GPS Based Attitude Determination On Nonaligned Antenna Arrays*, id. The test array was built as a rigid structure and having 4 mounted hemispherical field of view patch antennas, two of which were hinged so they could be rotated up to 30 degrees, and ground planes. Differential phase corrections were computed in post-processing form, were observed to be slowly varying over 30 minutes with magnitudes up to approximately 0.05 wavelengths, or 1 cm., and were positive valued (which is a function of array geometry). The size of the correction term depends on the rotation angles and will be larger for arrays with more rotation.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for determining a correction to a differential phase measurement of a carrier signal received by nonaligned antennas, said nonaligned antennas provided on a vehicle, said method comprising the steps of:

determining by a carrier signal receiver provided in the vehicle and coupled to the nonaligned antennas a correction term based on the circular polarization of the carrier signal received by each of the nonaligned antennas; and correcting by the carrier signal receiver each differential phase measurement using the correction terms.

2. The method as recited in claim 1, further comprising the step of determining by the carrier signal receiver the vehicle attitude.

3. The method as recited in claim 1, further comprising the step of selecting by the carrier receiver one of the nonaligned antennas as a master antenna.

4. The method as recited in claim 1, further comprising the step of selecting by the carrier receiver one of the nonaligned antennas as a master antenna, wherein the correcting step comprises the step of using the master antenna as a basis for determining the correction terms of the antennas other than the master antenna.

5. The method as recited in claim 1, wherein the correction terms are determined by the steps of:

selecting one of the nonaligned antennas as a master antenna, translating boresight vectors of the nonaligned antennas to the origin of a unit sphere, determining a first rotation angle of one of the nonaligned antennas about its boresight vector so that the x-axis thereof points along a line of sight vector to the carrier signal, determining a second rotation angle of another of the nonaligned antennas about its boresight vector so that the x-axis thereof points along the line of sight vector to the carrier signal, determining a third rotation angle of the another of the nonaligned antennas about a vector normal to its boresight vector to bring each of the nonaligned antennas to a common reference, and repeating the determining steps for each of the nonaligned antennas.

6. The method as recited in claim 5, further comprising the step of determining the attitude of the vehicle.

7. A method for determining an attitude of a vehicle, said method comprising the steps of:

receiving by a carrier signal receiver provided in the vehicle carrier signals, said carrier signal receiver being coupled to nonaligned antennas receiving the carrier signals;

determining by the carrier signal receiver the differential phase measurements of the carrier signals;

determining by the carrier signal receiver a correction term for each of the differential phase measurements;

correcting by the carrier signal receiver the differential phase measurements using the correction terms; and determining the attitude of the vehicle based upon the corrected differential phase measurements.

8. The method as recited in claim 7, wherein the correction terms are determined by the steps of:

selecting one of the nonaligned antennas as a master antenna, translating boresight vectors of the nonaligned antennas to the origin of a unit sphere, determining a first rotation angle of one of the nonaligned antennas about its boresight vector so that the x-axis thereof points along a line of sight vector to the carrier signal, determining a second rotation angle of another of the nonaligned antennas about its boresight vector so that the x-axis thereof points along the line of sight vector to the carrier signal, determining a third rotation angle of the another of the nonaligned antennas about a vector normal to its boresight vector to bring each of the nonaligned antennas to a common reference, and repeating the determining steps for each of the nonaligned antennas.

9. The method as recited in claim 7, further comprising the step of selecting by the carrier receiver one of the nonaligned antennas as a master antenna, wherein the correcting step comprises the step of using the master antenna as a basis for correcting the respective differential phase measurements of the antennas other than the master antenna.

10. The method as recited in claim 8, further comprising the step of selecting by the carrier receiver one of the nonaligned antennas as a master antenna, wherein the correcting step comprises the step of using the master antenna as a basis for correcting the respective differential phase measurements of the antennas other than the master antenna.

11. The method according to claim 3, wherein the master antenna is selected based upon the strength of the received carrier signal.

12. The method according to claim 5, wherein the master antenna is selected based upon the strength of the received carrier signal.

13. The method according to claim 8, wherein the master antenna is selected based upon the strength of the received carrier signal.

14. The method according to claim 1, wherein a number of the antennas is 8.

15. The method according to claim 3, wherein a number of the antennas is 8.

16. The method according to claim 1, wherein the carrier signal is a Global Positioning System carrier signal.

17. The method according to claim 3, wherein the carrier signal is a Global Positioning System carrier signal.

18. An apparatus determining a correction to a differential phase measurement of a carrier signal received by nonaligned antennas coupled to the apparatus and used to determine the vehicle attitude, said apparatus comprising:

means for determining a correction term based on the circular polarization of the carrier signal received by each of the nonaligned antennas; and means for correcting each differential phase measurement using the correction terms.

19. The apparatus according to claim 18, further comprising means for determining the attitude of the vehicle.

20. An apparatus determining the attitude of a vehicle, said apparatus comprising:

nonaligned antennas receiving carrier signals; and a processor, coupled to the nonaligned antennas, receiving the carrier signals, determining a position of the vehicle, and determining an attitude of the vehicle by determining correction terms based on the circular polarization of the received carrier signals and correcting each differential phase measurement using the correction terms.

21. The apparatus according to claim 20, wherein the carrier signals are Global Positioning System carrier signals.

22. The apparatus according to claim 20, said processor comprising:

a navigation module determining the position of the vehicle, and an attitude module determining the attitude of the vehicle.

* * * * *